United States Patent
Wankhede et al.

(10) Patent No.: US 11,318,403 B2
(45) Date of Patent: May 3, 2022

(54) AUTO DRAIN SYSTEM FOR VACUUM AND PRESSURE SIDE FUEL WATER SEPARATOR

(71) Applicant: Cummins Filtration IP, Inc, Columbus, IN (US)

(72) Inventors: Amit Shashikant Wankhede, Pune (IN); Peter K. Herman, Stoughton, WI (US); Arun P. Janakiraman, Stoughton, WI (US); Christopher E. Holm, Madison, WI (US); Prashant Wani, Pune (IN); Abhijit Shimpi, Columbus, IN (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 185 days.

(21) Appl. No.: 15/746,302

(22) PCT Filed: Aug. 16, 2016

(86) PCT No.: PCT/US2016/047204
§ 371 (c)(1),
(2) Date: Jan. 19, 2018

(87) PCT Pub. No.: WO2017/031128
PCT Pub. Date: Feb. 23, 2017

(65) Prior Publication Data
US 2018/0216588 A1 Aug. 2, 2018

Related U.S. Application Data

(60) Provisional application No. 62/205,888, filed on Aug. 17, 2015.

(51) Int. Cl.
*B01D 36/00* (2006.01)
*B01D 15/00* (2006.01)
(Continued)

(52) U.S. Cl.
CPC .......... *B01D 36/006* (2013.01); *B01D 15/00* (2013.01); *B01D 36/005* (2013.01);
(Continued)

(58) Field of Classification Search
CPC .... B01D 15/00; B01D 36/005; B01D 36/006; B01D 36/00; B01D 36/003; B01D 17/12;
(Continued)

(56) References Cited

U.S. PATENT DOCUMENTS

| 3,966,603 A | 6/1976 | Grant |
| 4,372,847 A | 2/1983 | Lewis |

(Continued)

FOREIGN PATENT DOCUMENTS

| CN | 204436652 U | * | 7/2015 | ............. F02M 37/22 |
| CN | 204436652 U | | 7/2015 | |

(Continued)

OTHER PUBLICATIONS

CN 204436652U English translation, dated Jul. 2015, Holm, Christopher E. et al.*

(Continued)

*Primary Examiner* — Akash K Varma
(74) *Attorney, Agent, or Firm* — Foley & Lardner LLP

(57) ABSTRACT

An automatic drain device is configured for use with a fuel water separator filter system. The automatic drain device includes a solenoid, a water-in-fuel sensor, and a controller configured to operate the automatic drain device by activating the solenoid in response to a signal from the water-in-fuel sensor. The automatic drain device may be utilized with suction side and pressure side fuel water separator filter systems. The automatic drain device operates independently of any user input.

13 Claims, 29 Drawing Sheets

(51) Int. Cl.
  *F02M 37/22* (2019.01)
  *F02D 33/00* (2006.01)
  *F02M 37/28* (2019.01)
  *F02M 37/32* (2019.01)
  *F02M 37/54* (2019.01)

(52) U.S. Cl.
  CPC ........... *F02D 33/003* (2013.01); *F02M 37/28* (2019.01); *F02M 37/32* (2019.01); *F02M 37/54* (2019.01)

(58) Field of Classification Search
  CPC .... B01D 35/157; B01D 25/176; B01D 29/00; F02M 37/24; F02M 37/22; F02M 37/221; F02M 37/28; F02M 37/32; F02M 37/54; F02M 37/0017; F02M 37/08; F02M 33/003; F02M 33/00; F02M 2200/24; F02D 33/003; F16K 31/124; F01P 7/02; A23L 2/56; A23L 2/60; A23L 27/00; A23L 27/36
  USPC ........................................................ 210/739
  See application file for complete search history.

(56) References Cited

U.S. PATENT DOCUMENTS

| | | | |
|---|---|---|---|
| 4,539,109 A | 9/1985 | Davis | |
| 4,637,351 A | 1/1987 | Pakula | |
| 4,799,504 A | 1/1989 | Scragg et al. | |
| 5,061,300 A | 10/1991 | Alexander, III | |
| 5,462,658 A | 10/1995 | Sem | |
| 5,505,165 A | 4/1996 | Kimoto | |
| 6,207,045 B1 | 3/2001 | Jiang | |
| 6,270,659 B1 | 8/2001 | Bagci et al. | |
| 6,371,087 B1 | 4/2002 | Condran et al. | |
| 6,422,396 B1 | 7/2002 | Li et al. | |
| 6,444,121 B1 | 9/2002 | Maxwell | |
| 6,517,615 B2 | 2/2003 | Miller et al. | |
| 6,526,741 B2 | 3/2003 | Whitehead et al. | |
| 7,150,269 B2 | 12/2006 | de Monts de Savasse et al. | |
| 7,445,704 B2 | 11/2008 | Jorgensen | |
| 7,527,739 B2 | 5/2009 | Jiang et al. | |
| 7,571,646 B1 | 8/2009 | Houghton | |
| 7,775,189 B2 | 8/2010 | Bejcek et al. | |
| 7,938,963 B2 | 5/2011 | Klein et al. | |
| 8,017,020 B2 | 9/2011 | Hoskin et al. | |
| 8,127,597 B2 | 3/2012 | Staley et al. | |
| 8,409,446 B2 | 4/2013 | Abdalla | |
| 8,733,087 B2 | 5/2014 | Core | |
| 8,783,007 B2 | 7/2014 | Mestroni et al. | |
| 8,893,689 B2 | 11/2014 | Dawar et al. | |
| 8,977,473 B2 | 3/2015 | Brown | |
| 9,255,829 B2 | 2/2016 | Leone et al. | |
| 9,353,713 B2 | 5/2016 | Terry et al. | |
| 9,422,900 B2 | 8/2016 | Pursifull | |
| 9,464,596 B2 | 10/2016 | Leone et al. | |
| 9,574,469 B2 | 2/2017 | Dawar et al. | |
| 2004/0046142 A1* | 3/2004 | Wilson | F02M 37/28 251/129.15 |
| 2006/0070956 A1* | 4/2006 | Herrmann | B01D 35/26 210/744 |
| 2006/0277899 A1 | 12/2006 | Ruona | |
| 2007/0039865 A1 | 2/2007 | Jiang et al. | |
| 2007/0240392 A1 | 10/2007 | Ng et al. | |
| 2008/0035537 A1 | 2/2008 | Klein et al. | |
| 2008/0110812 A1 | 5/2008 | Jensen et al. | |
| 2008/0314128 A1 | 12/2008 | Carmona et al. | |
| 2009/0065419 A1 | 3/2009 | Jiang | |
| 2009/0113880 A1 | 5/2009 | Clausen | |
| 2009/0289013 A1 | 11/2009 | Hoskin et al. | |
| 2010/0154727 A1 | 6/2010 | Malgorn et al. | |
| 2010/0192529 A1 | 8/2010 | Schuster | |
| 2011/0041920 A1* | 2/2011 | Abdalla | F02M 37/24 137/1 |
| 2011/0180051 A1 | 7/2011 | Schwandt et al. | |
| 2011/0180052 A1 | 7/2011 | Schwandt et al. | |
| 2011/0259802 A1 | 10/2011 | Wieczorek et al. | |
| 2012/0240901 A1 | 9/2012 | Yamada et al. | |
| 2012/0312022 A1 | 12/2012 | Lam et al. | |
| 2013/0153487 A1 | 6/2013 | Terry et al. | |
| 2013/0206114 A1 | 8/2013 | Bejcek et al. | |
| 2013/0255636 A1 | 10/2013 | Pursifull | |
| 2013/0291499 A1 | 11/2013 | Gardner | |
| 2014/0007771 A1 | 1/2014 | Chase et al. | |
| 2014/0260133 A1 | 9/2014 | Von Seggern | |
| 2014/0284263 A1 | 9/2014 | Duerr et al. | |
| 2014/0284264 A1 | 9/2014 | Klein et al. | |
| 2014/0284268 A1 | 9/2014 | Volkmer | |
| 2014/0311963 A1 | 10/2014 | Bortnik et al. | |
| 2015/0027422 A1 | 1/2015 | Schwandt et al. | |
| 2015/0047582 A1 | 2/2015 | Dawar et al. | |
| 2015/0122720 A1 | 5/2015 | Boiger et al. | |
| 2015/0182878 A1 | 7/2015 | Bultinck et al. | |
| 2015/0192450 A1 | 7/2015 | Leone et al. | |
| 2015/0240738 A1 | 8/2015 | Yerace et al. | |
| 2015/0284268 A1 | 10/2015 | Buttner | |
| 2015/0300222 A1 | 10/2015 | Khan et al. | |
| 2016/0222932 A1 | 8/2016 | Koppi et al. | |
| 2016/0263509 A1 | 9/2016 | De Wolf et al. | |
| 2016/0273471 A1 | 9/2016 | Shimpi et al. | |
| 2016/0296856 A1 | 10/2016 | Bultinck et al. | |
| 2017/0021295 A1 | 1/2017 | Willems et al. | |
| 2017/0031128 A1 | 2/2017 | Liu et al. | |
| 2017/0311285 A1 | 10/2017 | Ly et al. | |

FOREIGN PATENT DOCUMENTS

| | | |
|---|---|---|
| CN | 2044366520 U | 7/2015 |
| CN | 105764591 A | 7/2016 |
| CN | 105927433 A | 9/2016 |
| GB | 2 065 336 A | 6/1981 |
| WO | WO-2017/031128 | 2/2017 |

OTHER PUBLICATIONS

International Search Report and Written Opinion issued for PCT/US2016/047204, dated Nov. 14, 2016, 11 pages.
First Office Action issued for Indian Patent Application No. 201847000508, dated Feb. 10, 2020, 5 pages.
First Office Action issued for Indian Patent Application No. 202047010181 dated Apr. 19, 2021, 6 pages.
International Search Report and Written Opinion issued from PCT Application No. PCT/US2018/055394, dated Dec. 21, 2018, 14 pages.
Chinese Office Action issued for Chinese Patent Application No. CN 202010670202.2 dated Sep. 14, 2021, 7 pages.
Non-Final Office Action on U.S. Appl. No. 16/756,291 dated Oct. 6, 2021, 16 pages.
First Office Action issued for Chinese Patent Application No. 201880066548.2, dated May 28, 2021, 10 pages.

* cited by examiner

AUTO DRAIN SYSTEM FOR VACUUM AND PRESSURE SIDE FUEL WATER SEPARATOR

CROSS-REFERENCE TO RELATED APPLICATIONS

The present application is national stage of PCT Application No. PCT/US2016/047204, filed Aug. 16, 2016, which claims the benefit of priority to U.S. Provisional Patent Application No, 62/205,888, filed Aug. 17, 2015. The contents of both applications are hereby incorporated by reference in their entirety.

FIELD

The present application relates generally to fuel water separator filter systems.

BACKGROUND

Fuel water separator filters that filter fuel, for example diesel fuel, and also separate water from the fuel before the fuel is passed to the engine are known. Various fuel water separator filter constructions are described in, for example, U.S. Pat. Nos. 7,857,974 and 7,935,255. Periodic draining of the water that is separated from the fuel by the fuel water separator filter is generally required.

SUMMARY

Embodiments of this disclosure relate generally to an automatic drain system for fuel water separator filter systems. More specifically, the embodiments relate to an automatic drain system that includes electronic sensors to automatically drain water from a fuel water separator filter system without active involvement of the user.

In one embodiment, the automatic drain system may include a solenoid, an electronic controller, and a water-in-fuel sensor. The automatic drain system may be formed as a separate component or integrally with a fuel water separator filter system.

An automatic drain device for use with a fuel water separator filter system is provided in one embodiment. The automatic drain device includes a housing, a water-in-fuel sensor, a solenoid and a control unit. The control unit is configured to activate the solenoid in response to a signal from the water-in-fuel sensor. The activation of the solenoid places the automatic drain device in a condition such that fluid may flow into the automatic drain device.

The housing may include an upper housing comprising an inlet opening that allows fluid to flow into an interior portion of the automatic drain device, a lower housing comprising at least one vent, and an inner housing comprising a drain opening. The inner housing is disposed between the upper housing and the lower housing, and the interior portion of the automatic drain device is formed between the upper housing and the inner housing. The upper housing may additionally include an air vent configured to allow air to be communicated from the interior of the automatic drain device. The air vent may be located on an extension of the upper housing, such that the air vent is located at a higher fluid level than the inlet opening when the automatic drain device is installed in the fuel water separator system. The automatic drain device may additionally include a strainer engaged with the upper housing to prevent debris from entering the automatic drain device. The automatic drain device may include an absorbent media is disposed in the lower housing. The inner housing may be sealingly engaged with the upper housing. The upper housing may be attached directly to the lower housing. The upper housing may be attached to the lower housing by threaded engagement. The upper housing may be attached directly to the inner housing, and the inner housing may be attached directly to the lower housing, such that the upper housing is indirectly attached to the lower housing. The upper housing may be attached to the inner housing by threaded engagement. The upper housing may additionally include an attachment mechanism configured to attach the automatic drain device to the fuel water separator filter system. The automatic drain device may additionally include an inlet opening seal and a drain opening seal. The inlet opening seal may be disposed on the solenoid. The inlet opening seal may be disposed on the upper housing. The drain opening seal may be disposed on the solenoid. The drain opening seal may be disposed on the inner housing. The solenoid may be attached to the upper housing. The control unit may be attached to or located in the upper housing.

The automatic drain device may additionally include a biasing spring configured to maintain the solenoid in a position that prevents fluid flow into the automatic drain device when the solenoid is not activated. The solenoid may be a double plunger solenoid. The automatic drain device may additionally include an upper solenoid extension, and an air vent seal disposed on the upper solenoid extension. The upper solenoid extension may include an air flow passage, and the air vent seal may be configured to prevent air flow out of an air vent of the housing when the solenoid is not activated.

In another embodiment, a fuel water separator filter system is provided. The fuel water separator filter system includes a fuel water separator filter element, a filter housing including a water sump, and an automatic drain device configured to drain water from the water sump. The automatic drain device includes a housing, a water-in-fuel sensor, a solenoid, and a control unit. The control unit is configured to activate the solenoid in response to a signal from the water-in-fuel sensor. The activation of the solenoid places the automatic drain device in a condition such that fluid may flow from the water sump into the automatic drain device. The automatic drain device may take any of the forms described above.

In still another embodiment, a method for automatically draining water from a fuel water separator filter system is provided. The method includes receiving an indication of water detection from a water-in-fuel sensor disposed in a water sump of the fuel water separator filter system, activating a solenoid so as to drain water from the water sump to an interior of an automatic drain device in fluid communication with the water sump when the solenoid is activated, deactivating the solenoid after a predetermined period of time so as to prevent fluid flow from the water sump to the interior of the automatic drain device and allow the water to exit the interior of the automatic drain device. The method may be automatic and not require user input. The fuel water separator filter system may be any of the fuel water separator filter systems described above.

BRIEF DESCRIPTION OF THE DRAWINGS

References are made to the accompanying drawings that form a part of this disclosure, and which illustrate the embodiments in which the systems and methods described in this specification can be practiced.

DETAILED DESCRIPTION

Embodiments described and depicted herein relate generally to an automatic drain system for a fuel water separator filter system. More specifically, the embodiments relate to an automatic drain system that includes a solenoid, an electronic controller, and a water-in-fuel sensor.

In one embodiment, the automatic drain system is configured for use with a fuel water separator filter system located on a suction, low pressure, side of a fuel pump. In other embodiments, the automatic drain system is configured for use with a fuel water separator filter system located on a high pressure side of a fuel pump.

Fuel water separator filter systems require the periodic draining of water that has been removed from the fuel and stored in a water sump. A fuel water separator filter system may include a fuel water separator filter element and a filter housing including the water sump. The failure to drain the separated water may result in system failures, with the attendant repair and maintenance costs. Automated drain systems for use with fuel water separator filter systems as described herein operate independently of user control to drain the water from a fuel water separator, and thus remove the possibility that a user's failure to drain the water from a fuel water separator system may result in increased maintenance and repair costs. Additionally, an automated drain system as described herein allows water to be drained from a fuel water separator filter system while the fuel water separator filter system is in active use, such as when an engine supplied by the fuel water separator filter system is in operation.

Figure 1:
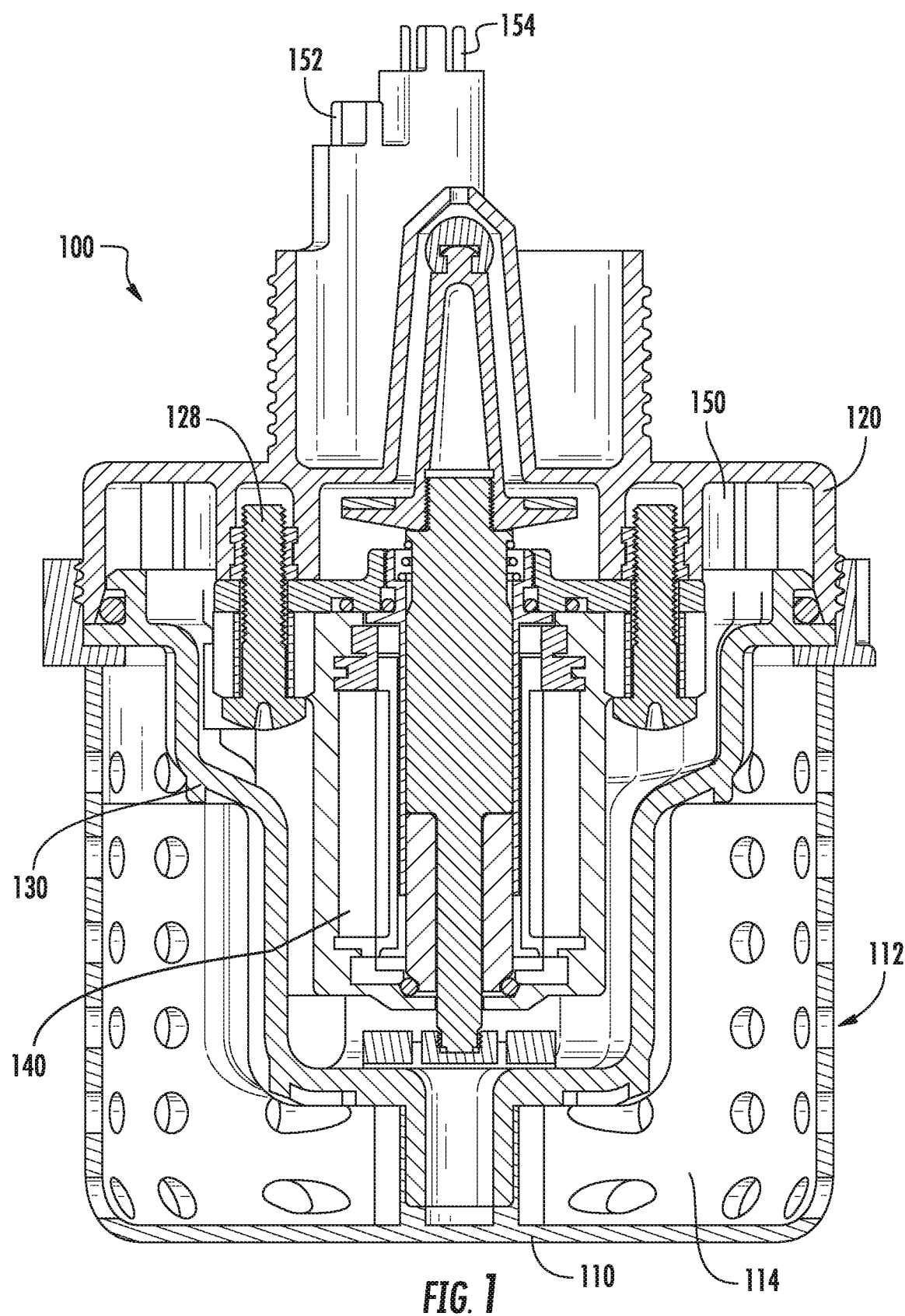
FIG. 1 is a cross-sectional view of a suction side automatic drain system, according to an embodiment.
Figure 2:
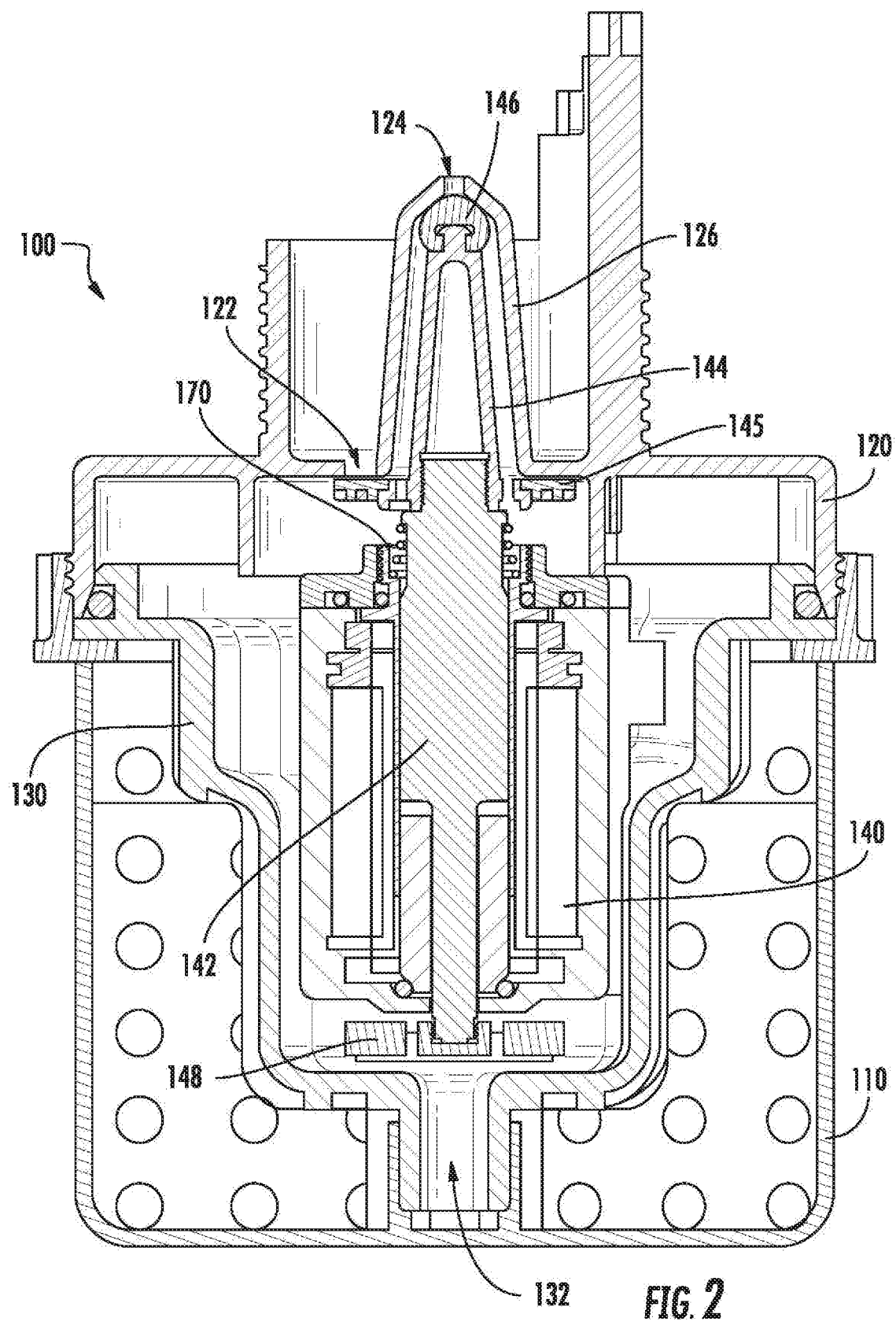
FIG. 2 is a cross-sectional view of the suction side automatic drain system of FIG. 1 in a closed condition.
Figure 3:
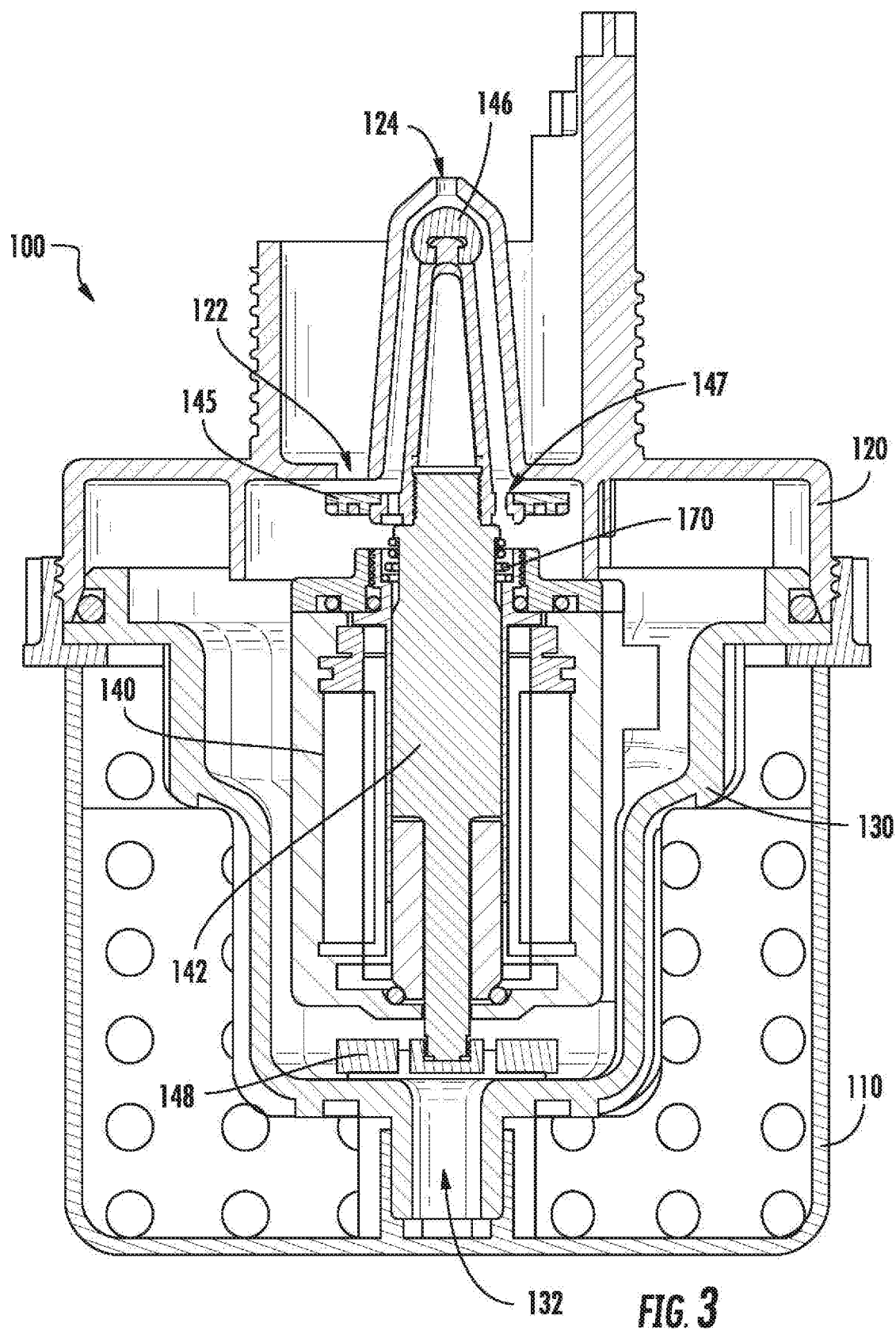
FIG. 3 is a cross-sectional view of the suction side automatic drain system of FIG. 1 in an open condition.

With reference to FIGS. 1-3, an automatic drain device 100 is illustrated for use with a fuel water separator filter located on a suction side of a fuel pump. The automatic drain device 100 includes a lower housing 110 and an upper housing 120. An inner housing 130 is located within and between the upper housing 120 and the lower housing 110. A controller 150 is included in the automatic drain device 100 and is connected to a solenoid 140. The automatic drain device 100 may include a connecting mechanism to connect the automatic drain device to a fuel water separator filter system such that a water drain port of the fuel water separator filter system is in fluid communication with the automatic drain device.

The upper housing 120 includes at least one drain opening 122. The drain opening 122 allows fluid, such as water, to flow from the water sump of the fuel water separator to an interior portion of the automatic drain device 100. A least one air vent 124 is also provided in the upper housing 120 such that air may be communicated from the interior portion of the automatic drain device 100 to the fuel water separator filter system. The air vent 124 may be located such that it is at a higher fluid level than the drain opening 122 when the automatic drain device 100 is installed in the fuel water separator filter system. In some embodiments, an air vent extension 126 may be formed in the upper housing 120 to achieve the desired relative location of the drain opening 122 and air vent 124. The relative location of the drain opening 122 and the air vent 124 and the low relative pressure within the suction side fuel water separator filter system ensures that water will flow out of the fuel water separator filter system through the drain opening and that air will flow into the fuel water separator filter system through the air vent.

The lower housing 110 may include one or more vents 112 that expose the interior of the lower housing to the outside environment. The vents 112 may be configured such that vapor or gas present in the interior of the lower housing may pass to the outside environment. The interior of the lower housing 110 may include an absorbent media 114. The absorbent media 114 may be any appropriate material, such as sponge or activated carbon. The absorbent media 114 may serve to absorb fluid drained from the fuel water separator filter system by the automated drain device, such that the fluid may evaporate through vents 112 over an extended period of time. The absorbent media 112 may reduce the contamination of the area surrounding the automatic drain device 100 by fluid released from the fuel water separator filter system. The absorbent media 114 may include a material for the treatment, such as a chemical treatment, of the fluid removed from the fuel water separator filter system.

The inner housing 130 engages with the upper housing 120, such that an interior portion of the automatic drain device 100 is formed between the upper housing and the inner housing. The inner housing 130 includes a drain opening 132 which allows fluid, such as water, to flow from the interior portion of the automatic drain device 100 to the interior of the lower housing 110. The volume of the interior portion of the automatic drain device 100 defines the maximum volume of water that may be drained from the fuel water separator filter system in a single drain operation. The inner housing 130 may be sealingly engaged with the upper housing 120. The seal between the inner housing 130 and the upper housing 120 may be produced by an o-ring or other resilient seal. In some embodiments, the inner housing 130 may be clamped between the upper housing 120 and the lower housing 110. For example, the lower housing 110 and the upper housing 120 may be attached through a threaded engagement, and the attachment of the lower housing to the upper housing may clamp the inner housing 130 in the desired relative location.

The solenoid 140 may be any suitable solenoid. In some embodiments, the solenoid 140 may include a double plunger 142. The double plunger 142 of the solenoid 140 may include an upper drain seal 145 and a lower drain seal 148, each disposed on opposite ends of the double plunger. The upper drain seal 145 is configured to prevent fluid flow through the drain opening 122 in the upper housing 120 when the solenoid 140 is in the closed position. An upper solenoid plunger extension 144 may be provided on the same end of the solenoid plunger 142 as the upper drain seal 145. An air vent seal 146 may be disposed on the upper solenoid plunger extension 144, and the air vent seal 146 is configured to prevent air flow through the air vent 124 when the solenoid 140 is in the closed position. The upper solenoid plunger extension 144 may include at least one air passage 147, configured to allow air to flow to the interior of the air vent extension 126 of the upper housing 120. The lower drain seal 148 is configured to prevent fluid flow through the drain opening 132 in the inner housing 130 when the solenoid 140 is in the open position. The upper drain seal 145, air vent seal 146 and lower drain seal 148 may be formed from any suitable material, such as an elastomer or other resilient polymer material. In other embodiments, the upper drain seal, air vent seal and lower drain seal may be fixed to the upper housing and inner housing, such that the double plunger may engage the seals and prevent flow through the associated openings. The solenoid 140 may be secured to the upper housing 120 by at least one attachment apparatus 128, such as screws.

A biasing member 170 is provided to maintain the solenoid plunger 142 in the closed position, except when the solenoid 140 is activated. The biasing member 170 may be a coil spring or another form of spring in various embodiments. The biasing member 170 provides a biasing force that maintains the solenoid plunger 142 in a closed position such that the upper drain seal 145 and air vent seal 146 prevent flow through the drain opening 122 and air vent 124, respectively. The activation of the solenoid 140 counteracts the biasing force of the biasing member 170, such that the solenoid plunger moves to the open position and flow is allowed through the drain opening 122 and air vent 124. Such an arrangement ensures that in the event of a failure of the solenoid 140 the automatic drain device 100 will be maintained in a closed position by the biasing force of the biasing member 170.

The controller 150 may be mounted to or in the upper housing 120. The controller 150 may be in electronic communication with a lower water-in-fuel (WIF) sensor 152 and an upper WIF sensor 154. The controller 150 is configured to operate the solenoid 140 based on the information received from at least the lower WIF sensor 152. The controller 150 may include a processor and memory, and may be programmed specifically to achieve the desired operation of the automatic drain device 100. The connections between the controller 150, the solenoid 140, the lower WIF sensor 152 and the upper WIF sensor 154 may be made without the use of external wiring, such that the connections are contained entirely within the automatic drain device 100. The controller 150 may also be connected to an electronic control module (ECM) of a vehicle or other machine in which the fuel water separator filter system is included, such that the activities of the automatic drain device 100 may be monitored by the ECM and error messages may be communicated from the controller 150 to the ECM.

The controller 150 may be programmed such that when the lower WIF sensor 152 detects the presence of water, the automatic drain device 100 is activated. The detection of water by the lower WIF sensor 152 indicates that the water level in the water sump of the fuel water separator filter system has reached a level where draining is required. The controller then activates the solenoid 140 by sending an electrical signal such that the solenoid plunger 142 is moved from the closed position, as shown in FIG. 2, to the open position, as shown in FIG. 3. The activation of the solenoid 140 by the controller may be delayed by a predetermined amount of time after the detection of water by the lower WIF sensor 152. The solenoid plunger 142 is maintained in the open position for a predetermined amount of time, such that a desired amount of water is drained from the fuel water separator filter system through the drain opening 122 into the interior portion of the automatic drain device 100 formed between the upper housing 120 and the lower housing 110. After the desired amount of water is drained from the fuel water separator filter system, the controller 150 stops the activation of the solenoid 140 and the solenoid plunger 142 is returned to the closed position by the biasing force of the biasing member 170. The water that is present in the interior portion of the automatic drain device 100 then flows through the drain opening 132 and into the interior portion of the lower housing 110, such that the water is absorbed by the absorbent media 114. The absorbed water contained in the absorbent media 114 may then be released to the outside environment through the vents 112.

Figure 4:
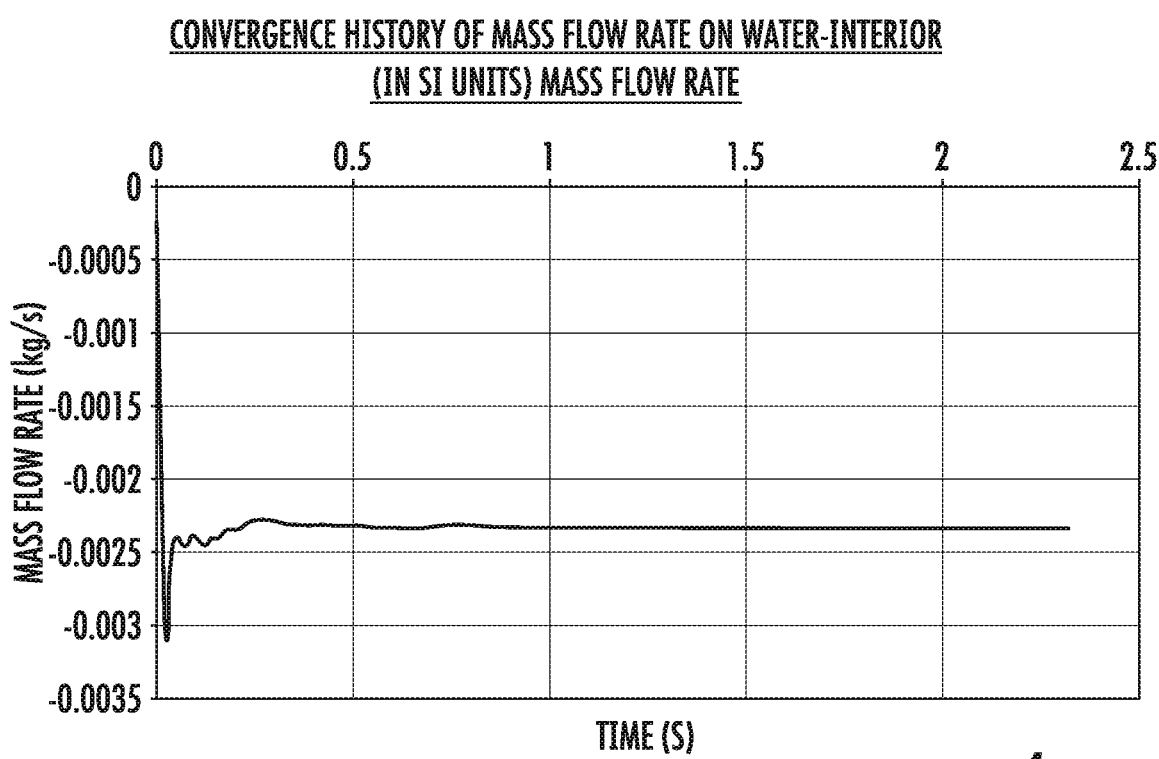
FIG. 4 is a plot of the mass flow rate of water from an interior of a fuel water separator filter system as a function of time when employing a suction side automatic drain system in one implementation.
Figure 5:
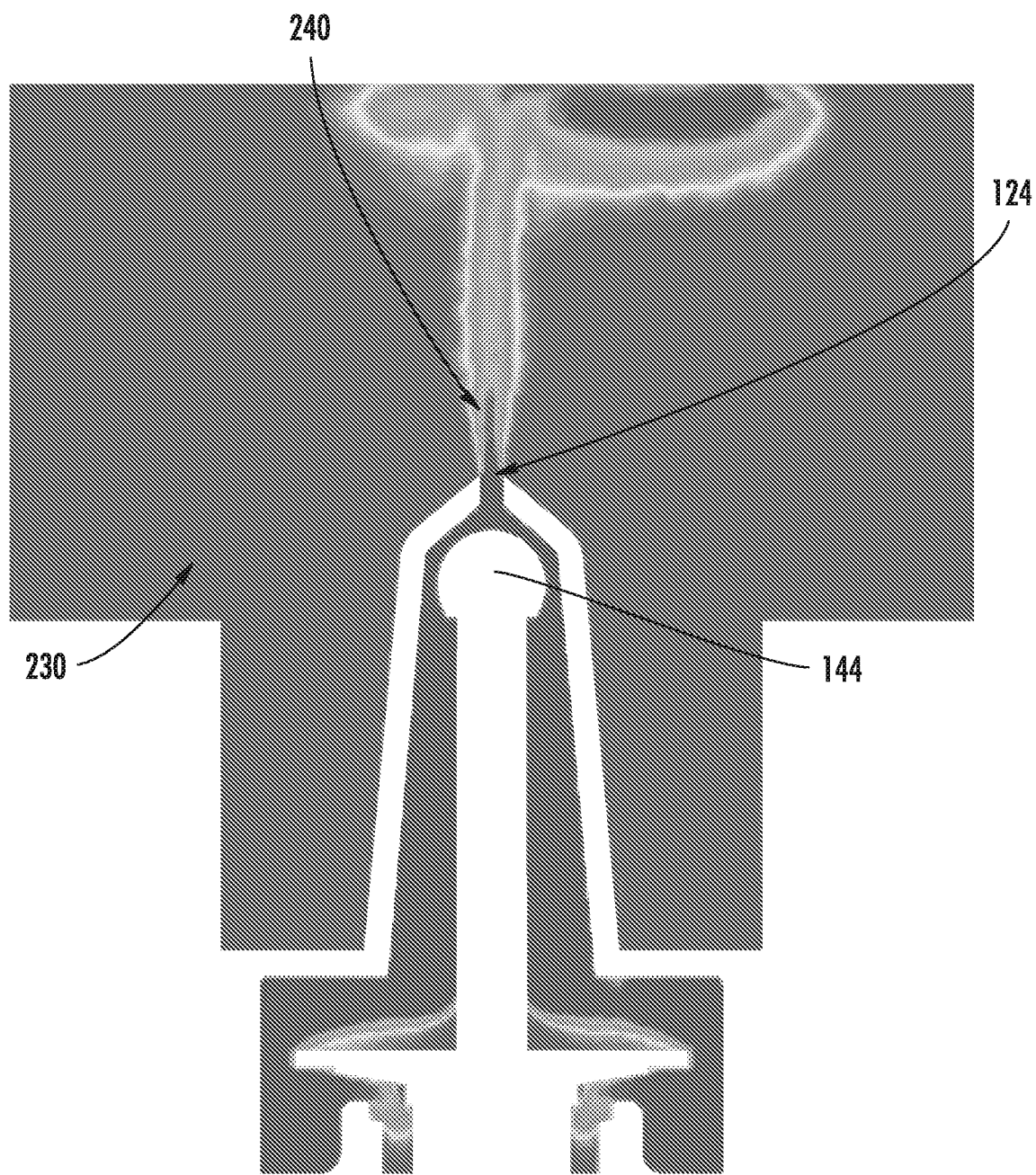
FIG. 5 is a computational fluid dynamics representation of the air-water interface utilizing the volume of fluid method when a suction side automatic drain system is in an open position.
Figure 6:
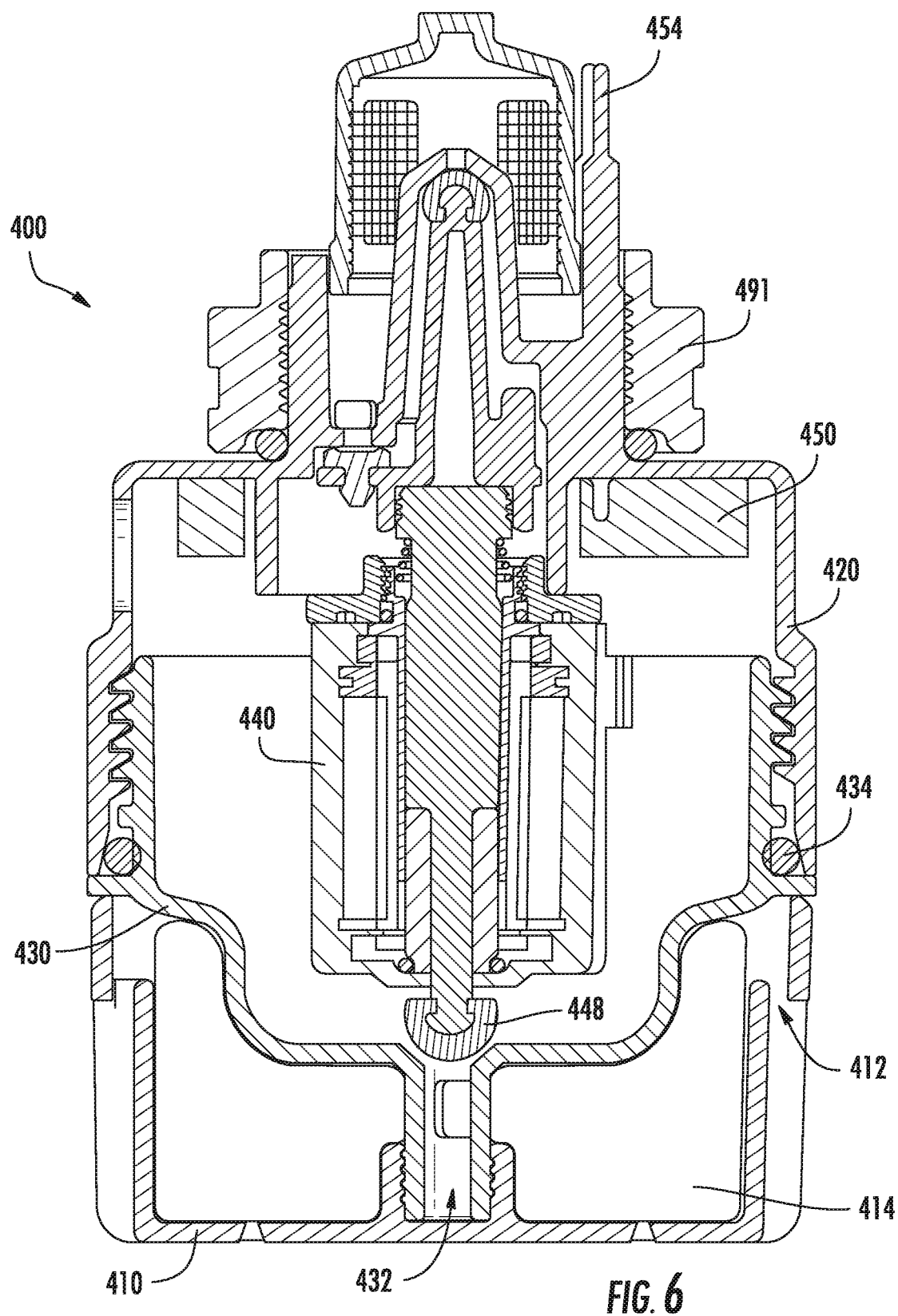
FIG. 6 is a cross-sectional view of a suction side automatic drain system, according to an embodiment.
Figure 7:
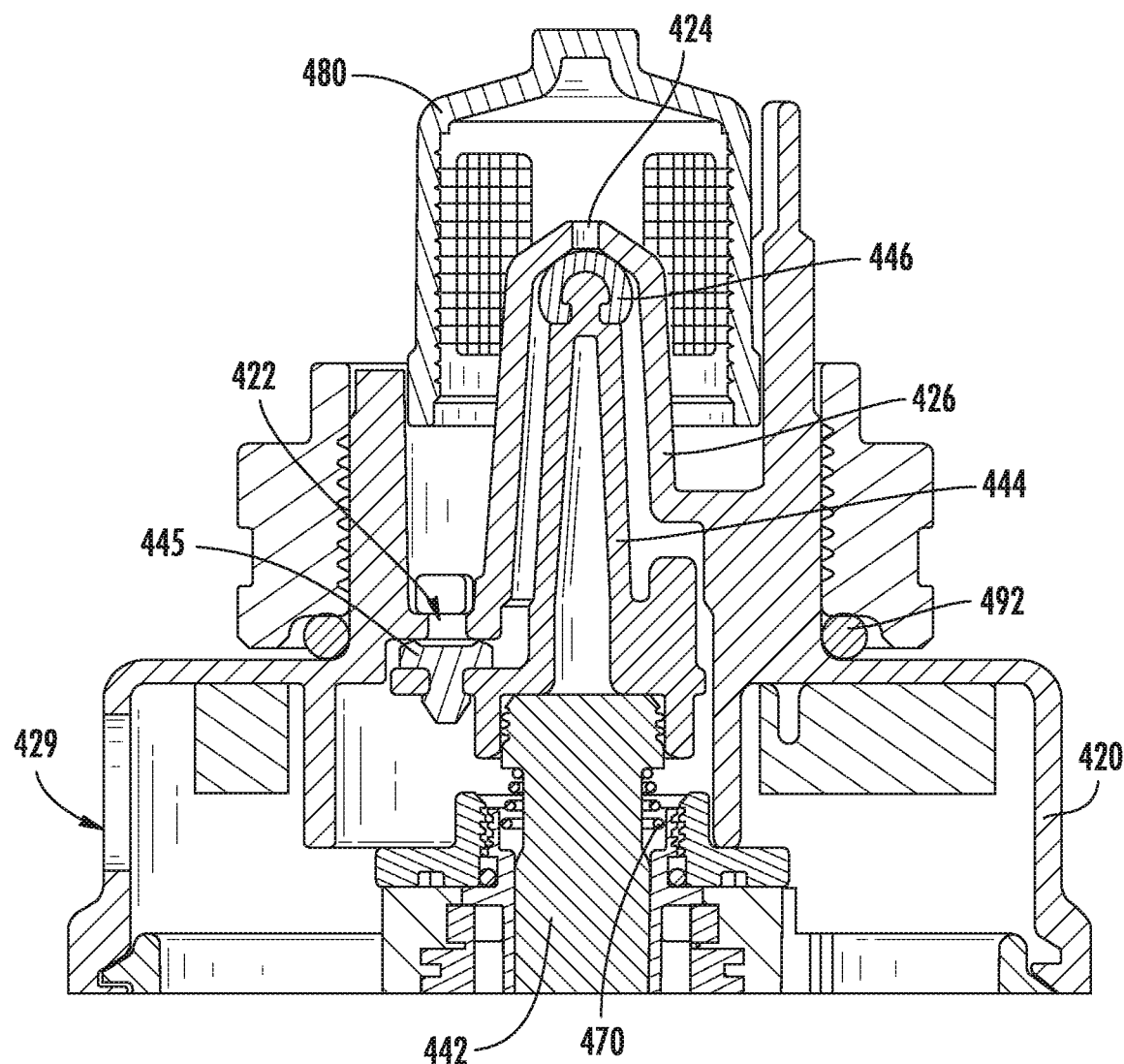
FIG. 7 is a detailed cross-sectional view of a portion of the suction side automatic drain system of FIG. 6.
Figure 8:
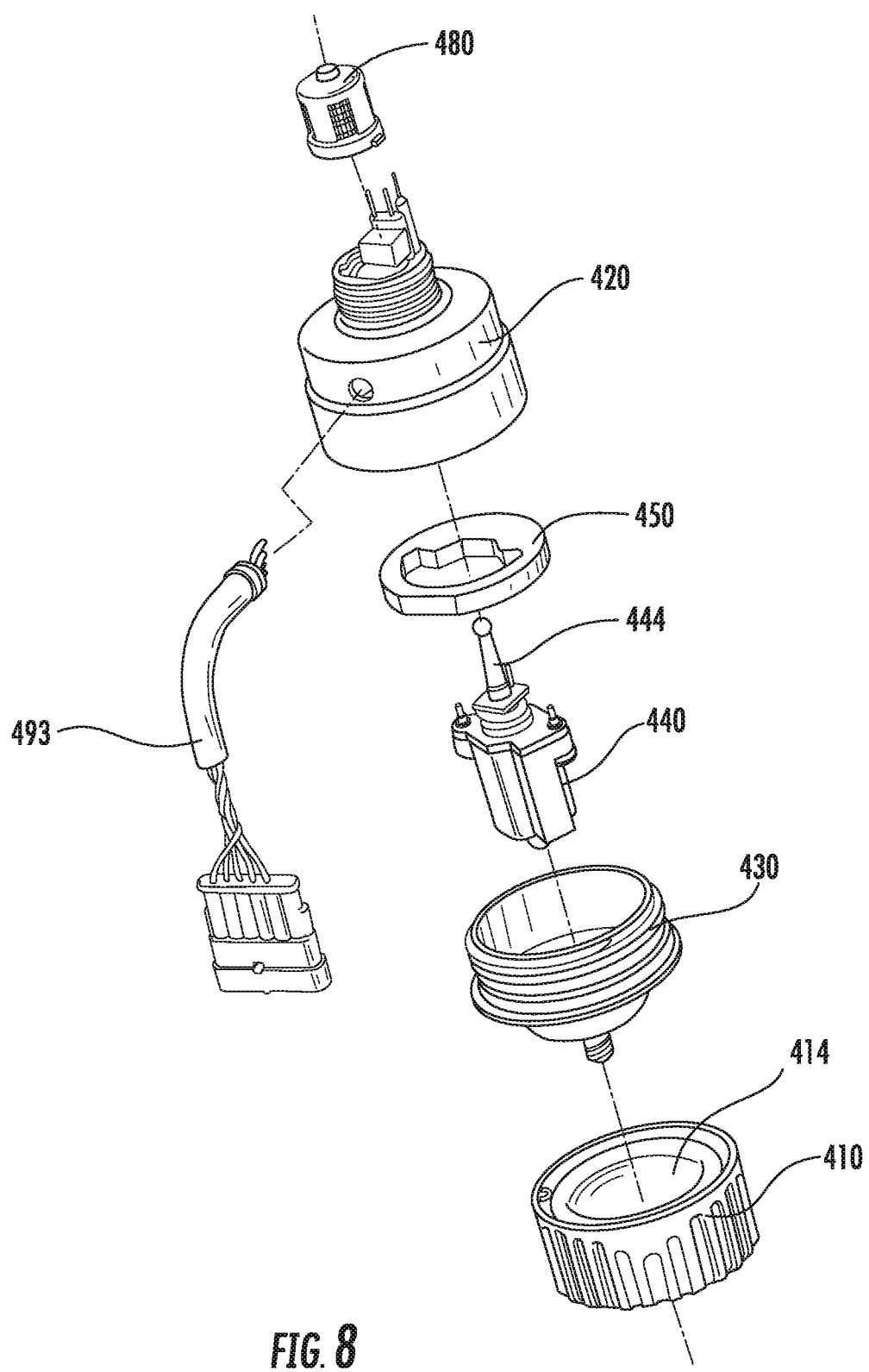
FIG. 8 is an exploded perspective view of the suction side automatic drain system of FIG. 6.
Figure 9:
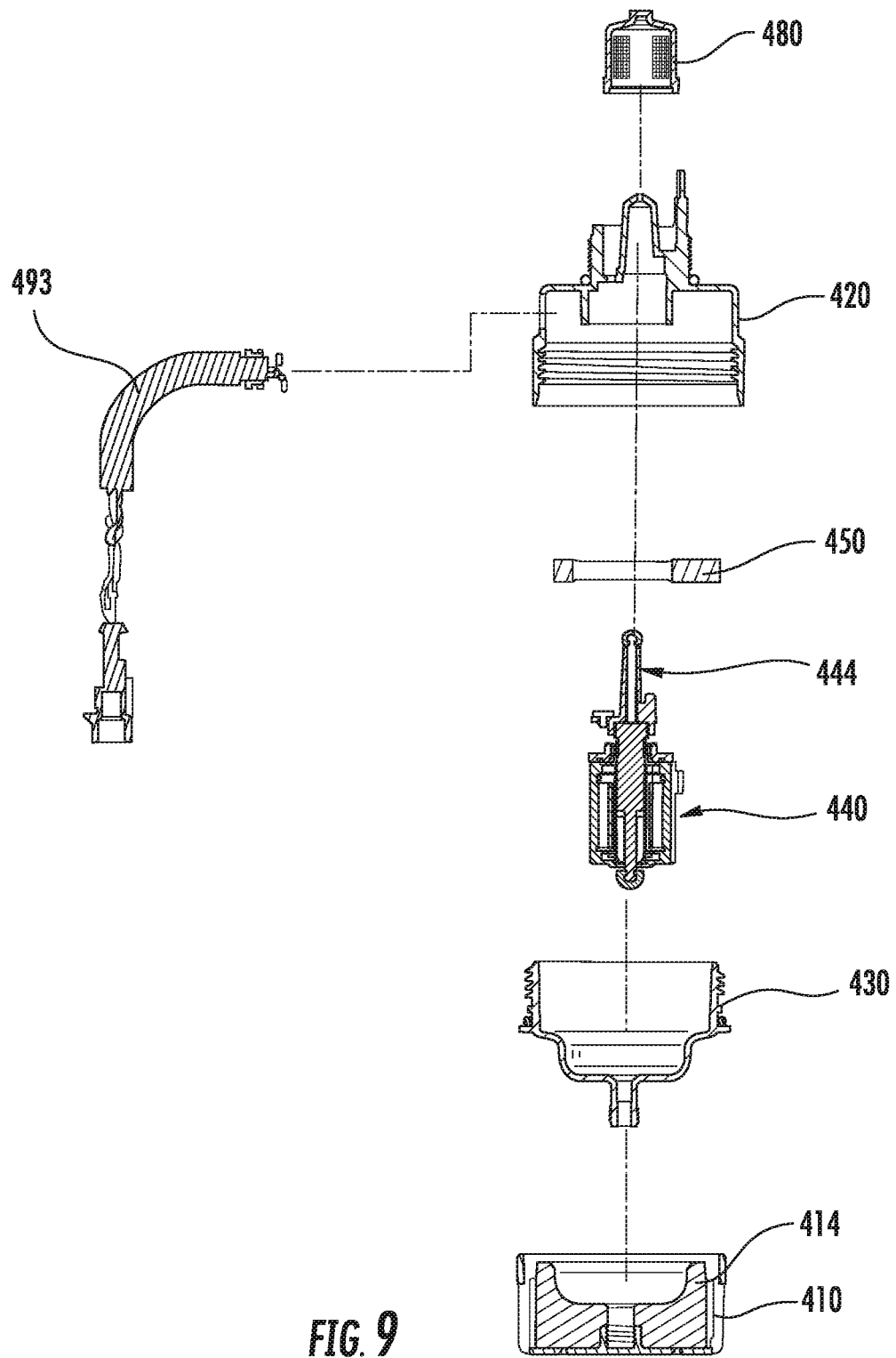
FIG. 9 is an exploded cross-sectional view of the suction side automatic drain system of FIG. 6.
Figure 10:
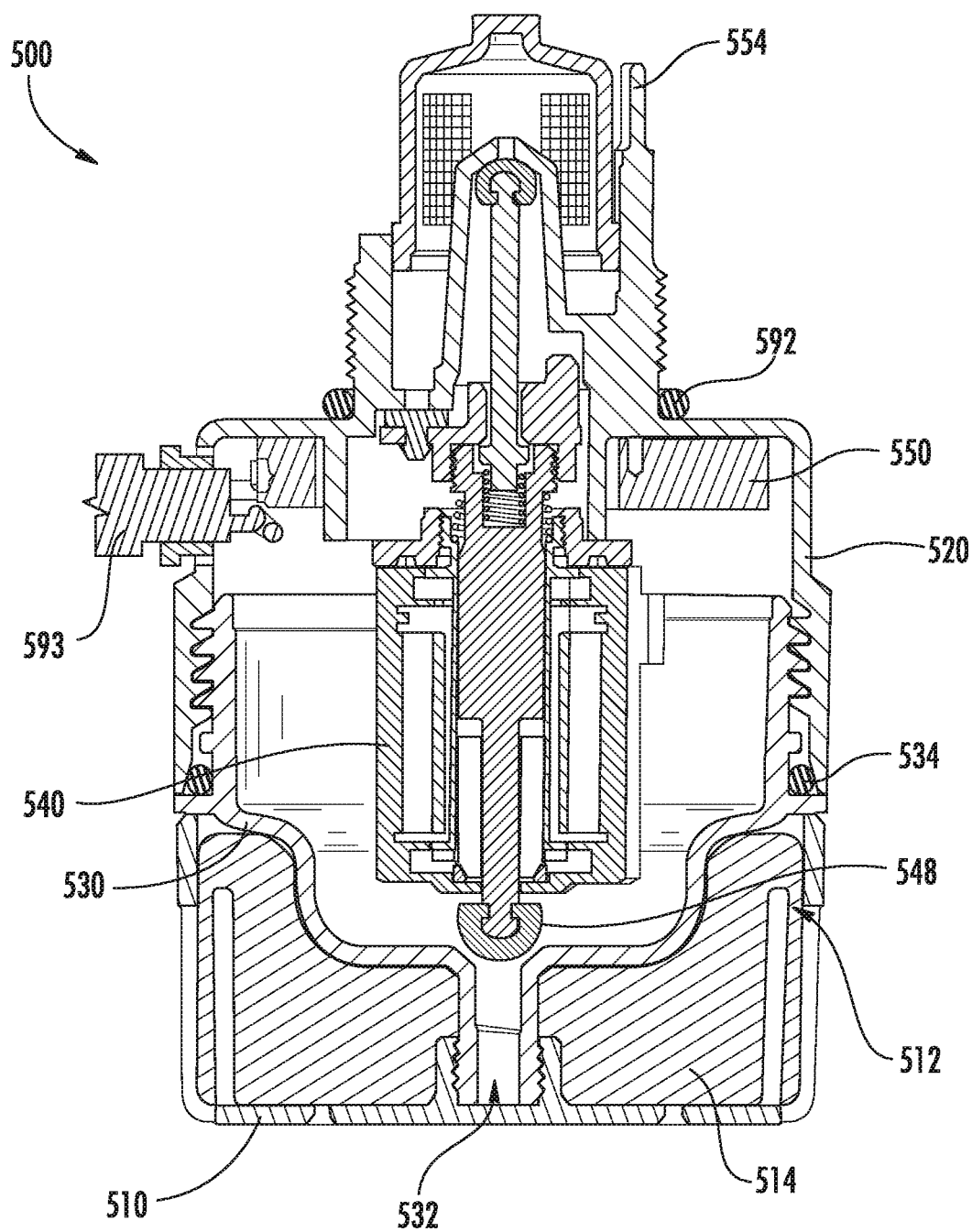
FIG. 10 is a cross-sectional view of a suction side automatic drain system, according to another embodiment.
Figure 11:
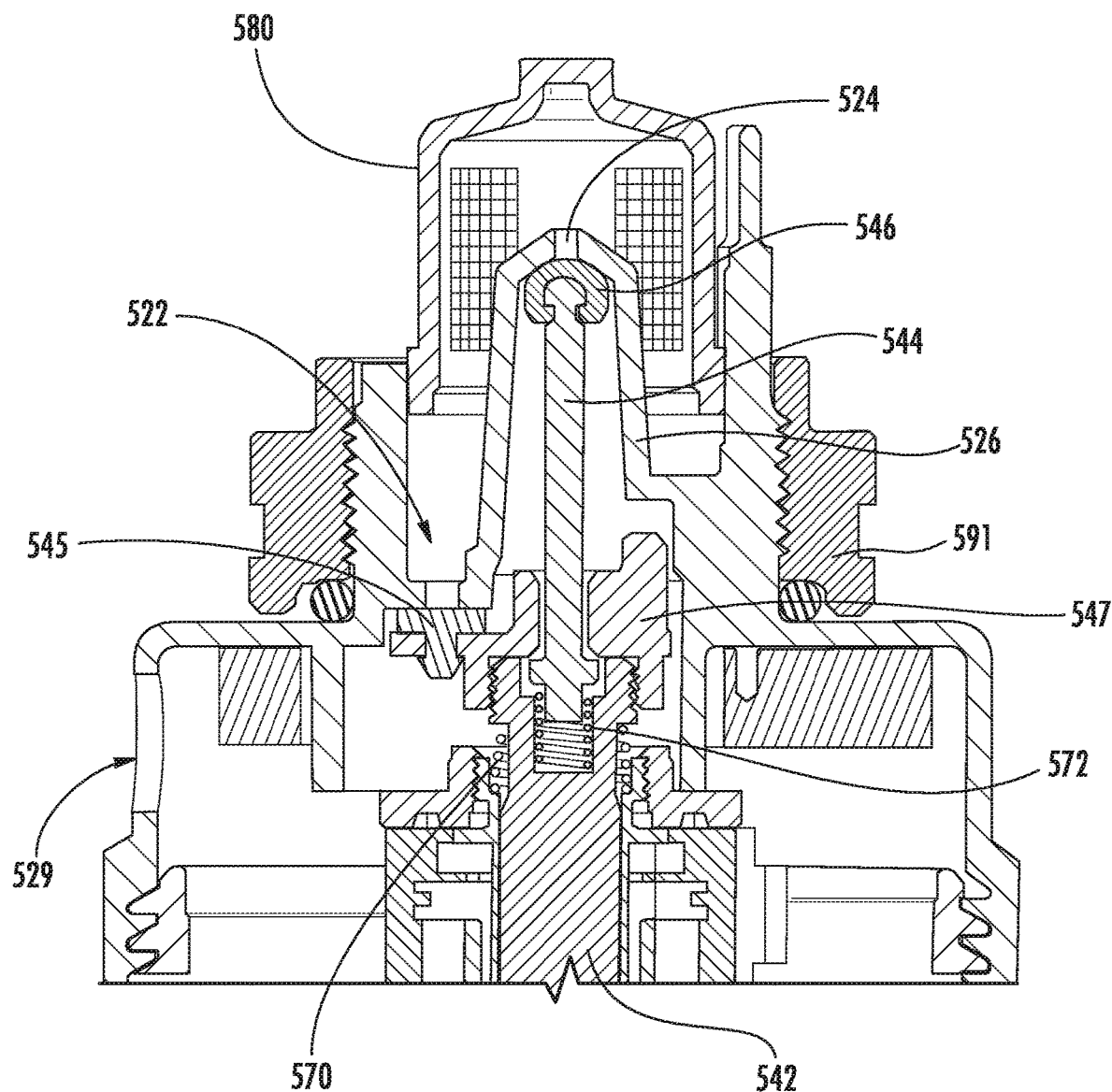
FIG. 11 is a detailed cross-sectional view of a portion of the suction side automatic drain system of FIG. 10.
Figure 12:
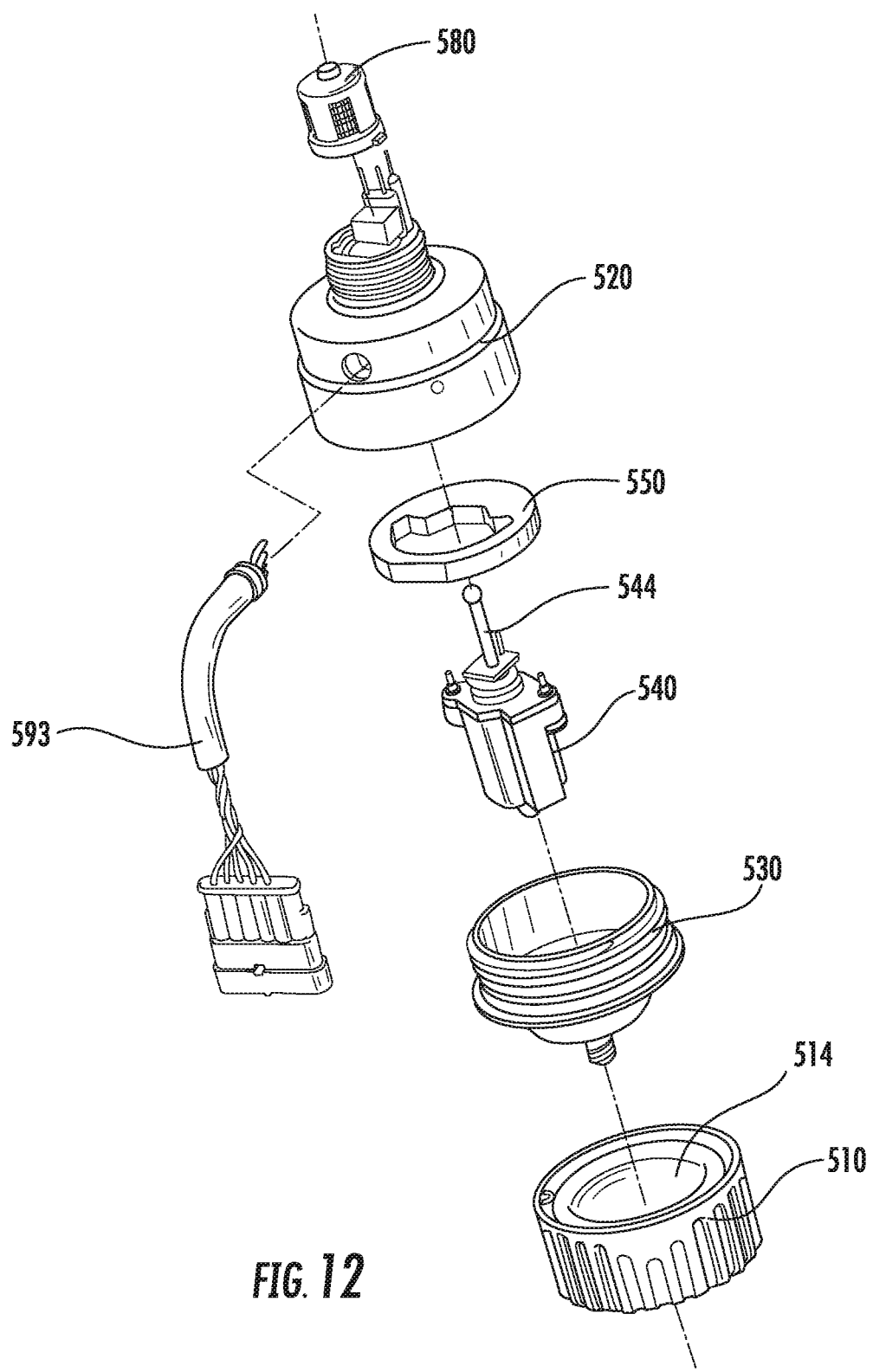
FIG. 12 is an exploded perspective view of the suction side automatic drain system of FIG. 10.
Figure 13:
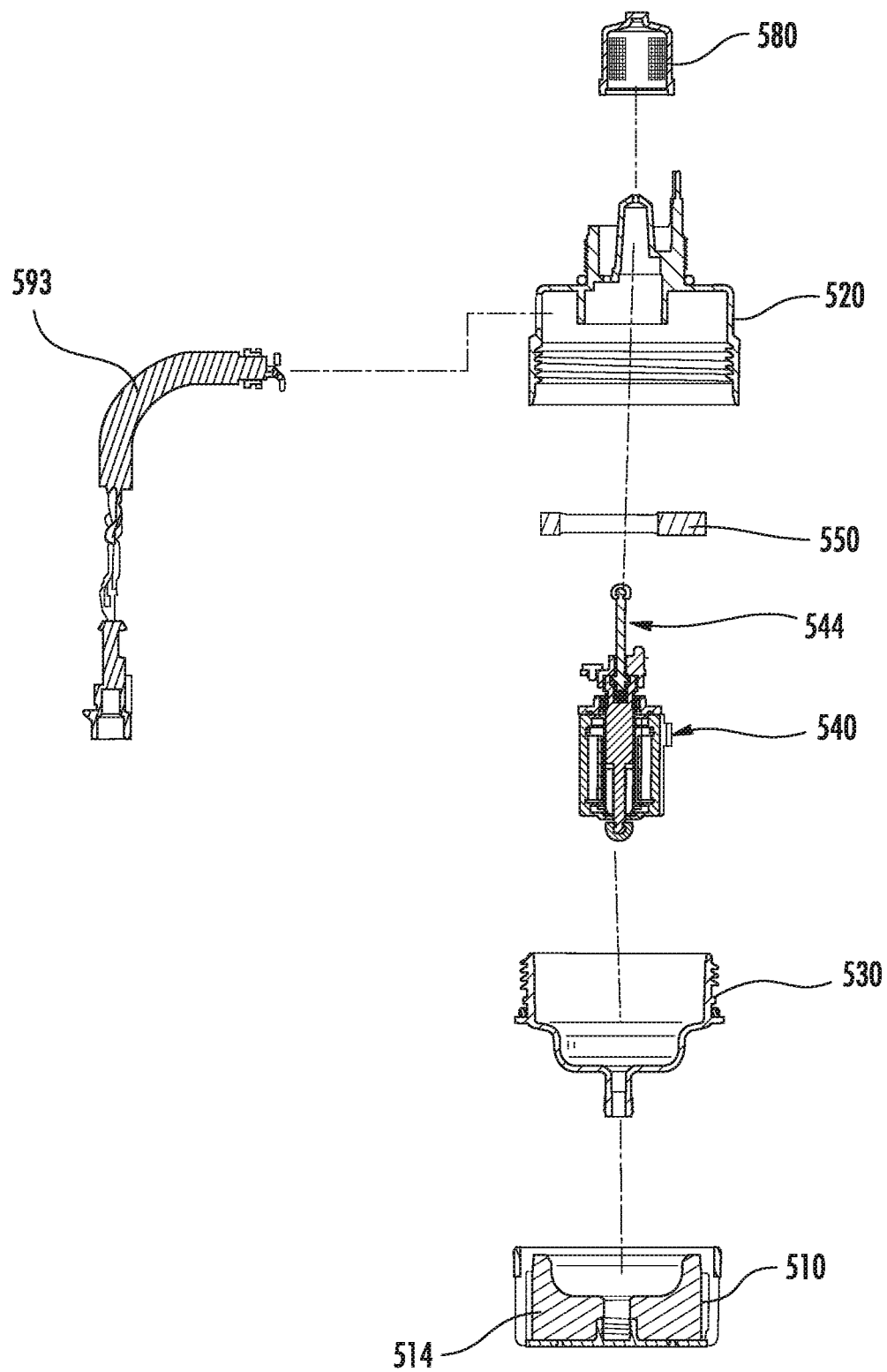
FIG. 13 is an exploded cross-sectional view of the suction side automatic drain system of FIG. 10.

The design of the automatic drain device 100 produces a substantially constant mass flow rate of water from the fuel water separator filter to the automatic drain device. As illustrated by the computational fluid dynamic model shown in FIG. 4, in less than 0.5 seconds after the solenoid is activated to place the automatic drain device in an open position a substantially constant mass flow rate is established. This characteristic of the automatic drain device allows the amount of water removed from the fuel water separator to be accurately controlled by controlling the time period that the automatic drain device is in the open position. The flow characteristics of the automatic drain device in the open position were modeled utilizing a volume of fluid method of computation fluid dynamics, as shown in FIG. 5. In an open state, air 240 flows past the air vent seal 146 and through the air vent 124 into the water sump 230 of the fuel water separator. This flow of air contributes to the establishment of the substantially constant mass flow rate out of the water sump of the fuel water separator filter system, by at least in part replacing the volume of the fluid removed from the water sump.

With reference to FIGS. 6-9, another automatic drain device 400 is illustrated for use with a fuel water separator filter located on a suction side of a fuel pump. The automatic drain device 400 includes a lower housing 410 and an upper housing 420. An inner housing 430 is located within and between the upper housing 420 and the lower housing 410. A controller 450 is included in the automatic drain device 400 and is connected to a solenoid 440. The automatic drain device 400 may include a connecting mechanism to connect the automatic drain device to a fuel water separator filter system such that a water drain port of the fuel water separator filter system is in fluid communication with the automatic drain device.

The upper housing 420 includes at least one drain opening 422. The drain opening 422 allows fluid, such as water, to flow from the water sump of the fuel water separator to an interior portion of the automatic drain device 400. A least one air vent 424 is also provided in the upper housing 420 such that air may be communicated from the interior portion of the automatic drain device 400 to the fuel water separator filter system. The air vent 424 may be located such that it is at a higher fluid level than the drain opening 422 when the automatic drain device 400 is installed in the fuel water separator filter system. In some embodiments, an air vent extension 426 may be formed in the upper housing 420 to achieve the desired relative location of the drain opening 422 and air vent 424. The relative location of the drain opening 422 and the air vent 424 and the low relative pressure within the suction side fuel water separator filter system ensures that water will flow out of the fuel water separator filter system through the drain opening and that air will flow into the fuel water separator filter system through the air vent.

The upper housing 420 may engage with a strainer element 480. The strainer element 480 may be configured to prevent debris present in the fuel water separator system from entering the automatic drain device 400. Such debris may result in the blockage of the drain openings or interfere with the sealing of the drain openings, preventing the desired operation characteristics of the automatic drain device 400. The strainer 480 may include a cage or frame like structure, openings in which are provided with a filtration media. The filtration media of the strainer 480 may be any appropriate filtration media, such as a wire or polymer mesh. The strainer 480 may be removable from the automatic drain device 400 for cleaning or replacement.

The lower housing 410 may include one or more vents 412 that expose the interior of the lower housing to the outside environment. The vents 412 may be configured such that vapor or gas present in the interior of the lower housing may pass to the outside environment. The interior of the lower housing 410 may include an absorbent media 414. The absorbent media 414 may be any appropriate material, such as sponge or activated carbon. The absorbent media 414 may serve to absorb fluid drained from the fuel water separator filter system by the automated drain device, such that the fluid may evaporate through vents 412 over an extended period of time. The absorbent media 412 may reduce the contamination of the area surrounding the automatic drain device 400 by fluid released from the fuel water separator filter system. The absorbent media 414 may include a material for the treatment, such as a chemical treatment, of the fluid removed from the fuel water separator filter system.

The inner housing 430 engages with the upper housing 420, such that an interior portion of the automatic drain device 400 is formed between the upper housing and the inner housing. The inner housing 430 includes a drain opening 432 which allows fluid, such as water, to flow from the interior portion of the automatic drain device 400 to the interior of the lower housing 410. The volume of the interior portion of the automatic drain device 400 defines the maximum volume of water that may be drained from the fuel water separator filter system in a single drain operation. The inner housing 430 may be sealingly engaged with the upper housing 420. The seal between the inner housing 430 and the upper housing 420 may be produced by an o-ring or other resilient seal 434. In some embodiments, the inner housing 430 may be attached through a threaded engagement to the upper housing 420.

The solenoid 440 may be any suitable solenoid. In some embodiments, the solenoid 440 may include a double plunger 442. The double plunger 442 of the solenoid 440 may include an upper drain seal 445 and a lower drain seal 448, each disposed on opposite ends of the double plunger. The upper drain seal 445 is configured to prevent fluid flow through the drain opening 422 in the upper housing 420 when the solenoid 440 is in the closed position. An upper solenoid plunger extension 444 may be provided on the same end of the solenoid plunger 442 as the upper drain seal 445. An air vent seal 446 may be disposed on the upper solenoid plunger extension 444, and the air vent seal 446 is configured to prevent air flow through the air vent 424 when the solenoid 440 is in the closed position. The lower drain seal 448 is configured to prevent fluid flow through the drain opening 432 in the inner housing 430 when the solenoid 440 is in the open position. The upper drain seal 445, air vent seal 446 and lower drain seal 448 may be formed from any suitable material, such as an elastomer or other resilient polymer material. In other embodiments, the upper drain seal, air vent seal and lower drain seal may be fixed to the upper housing and inner housing, such that the double plunger may engage the seals and prevent flow through the associated openings.

A biasing member 470 is provided to maintain the solenoid plunger 442 in the closed position, except when the solenoid 440 is activated. The biasing member 470 may be a coil spring or another form of spring in various embodiments. The biasing member 470 provides a biasing force that maintains the solenoid plunger 442 in a closed position such that the upper drain seal 445 and air vent seal 446 prevent flow through the drain opening 422 and air vent 424, respectively. The activation of the solenoid 440 counteracts the biasing force of the biasing member 470, such that the solenoid plunger moves to the open position and flow is allowed through the drain opening 422 and air vent 424. Such an arrangement ensures that in the event of a failure of the solenoid 440 the automatic drain device 400 will be maintained in a closed position by the biasing force of the biasing member 470.

The controller 450 may be mounted to or in the upper housing 420. The controller 450 may be in electronic communication with one or more WIF sensors 454. The controller 450 is configured to operate the solenoid 440 based on the information received from the WIF sensors 454. The controller 450 may include a processor and memory, and may be programmed specifically to achieve the desired operation of the automatic drain device 400. The connections between the controller 450, the solenoid 440, and the WIF sensors 454 may be made without the use of external wiring, such that the connections are contained entirely within the automatic drain device 400. The controller 450 may also be connected by an electronic connector 493 to an electronic control module (ECM) of a vehicle or other machine in which the fuel water separator filter system is included, such that the activities of the automatic drain device 400 may be monitored by the ECM and error messages may be communicated from the controller 450 to the ECM. The upper housing 420 may include an opening 429 configured to receive the electronic connector 493, such that the connector 493 may engage the controller 450.

The controller 450 may be programmed such that when the WIF sensor 454 detects the presence of water, the automatic drain device 400 is activated. The detection of water by the WIF sensor 454 indicates that the water level in the water sump of the fuel water separator filter system has reached a level where draining is required. The controller then activates the solenoid 440 by sending an electrical signal such that the solenoid plunger 442 is moved from the closed position. The solenoid plunger 442 is maintained in the open position for a predetermined amount of time, such that a desired amount of water is drained from the fuel water separator filter system through the drain opening 422 into the interior portion of the automatic drain device 400 formed between the upper housing 420 and the inner housing 410. After the desired amount of water is drained from the fuel water separator filter system, the controller 450 stops the activation of the solenoid 440 and the solenoid plunger 442 is returned to the closed position by the biasing force of the biasing member 470. The water that is present in the interior portion of the automatic drain device 400 then flows through the drain opening 432 and into the interior portion of the lower housing 410, such that the water is absorbed by the absorbent media 414. The absorbed water contained in the absorbent media 414 may then be released to the outside environment through the vents 412.

The upper housing 420 may include an attachment mechanism, such as external threads, that engage a corresponding portion 491 of the fuel water separator filter system. The attachment mechanism produces a seal between the automatic drain device 400 and the fuel water separator filter system. A seal element 492 may be provided on the upper housing 420 to ensure a fluid tight seal is formed between the automatic drain device 400 and the fuel water separator filter system.

With reference to FIGS. 10-20, another automatic drain device 500 is illustrated for use with a fuel water separator filter located on a suction side of a fuel pump. The automatic drain device 500 includes a lower housing 510 and an upper housing 520. An inner housing 530 is located within and between the upper housing 520 and the lower housing 510.

A controller 550 is included in the automatic drain device 500 and is connected to a solenoid 540. The automatic drain device 500 may include a connecting mechanism to connect the automatic drain device to a fuel water separator filter system such that a water drain port of the fuel water separator filter system is in fluid communication with the automatic drain device.

The upper housing 520 includes at least one drain opening 522. The drain opening 522 allows fluid, such as water, to flow from the water sump of the fuel water separator to an interior portion of the automatic drain device 500. A least one air vent 524 is also provided in the upper housing 520 such that air may be communicated from the interior portion of the automatic drain device 500 to the fuel water separator filter system. The air vent 524 may be located such that it is at a higher fluid level than the drain opening 522 when the automatic drain device 500 is installed in the fuel water separator filter system. In some embodiments, an air vent extension 526 may be formed in the upper housing 520 to achieve the desired relative location of the drain opening 522 and air vent 524. The relative location of the drain opening 522 and the air vent 524 and the low relative pressure within the suction side fuel water separator filter system ensures that water will flow out of the fuel water separator filter system through the drain opening and that air will flow into the fuel water separator filter system through the air vent.

The upper housing 520 may engage with a strainer element 580. The strainer element 580 may be configured to prevent debris present in the fuel water separator system from entering the automatic drain device 500. Such debris may result in the blockage of the drain openings or interfere with the sealing of the drain openings, preventing the desired operation characteristics of the automatic drain device 500. The strainer 580 may include a cage or frame like structure, openings in which are provided with a filtration media. The filtration media of the strainer 580 may be any appropriate filtration media, such as a wire or polymer mesh. The strainer 580 may be removable from the automatic drain device 500 for cleaning or replacement.

Figure 19:
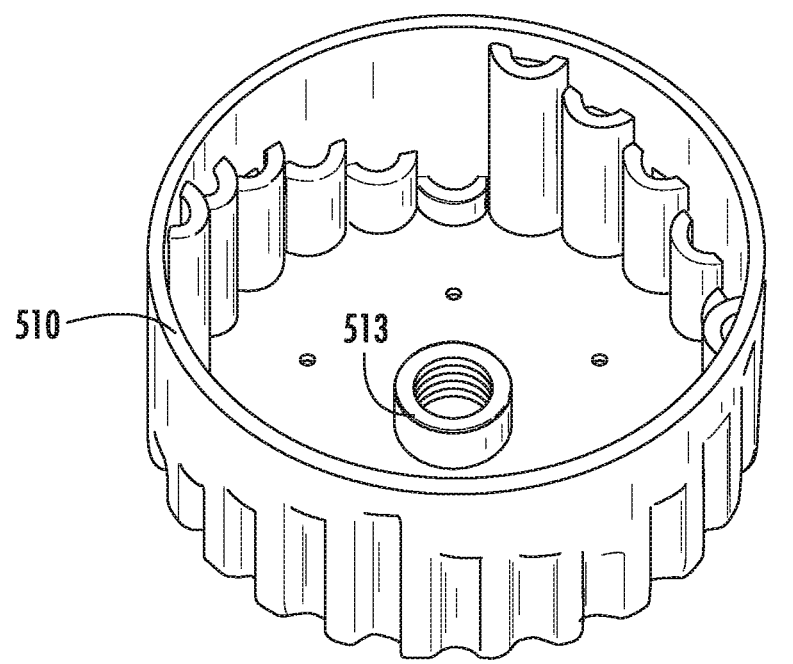
FIG. 19 is perspective view of the lower housing of the suction side automatic drain system of FIG. 10.
Figure 20:
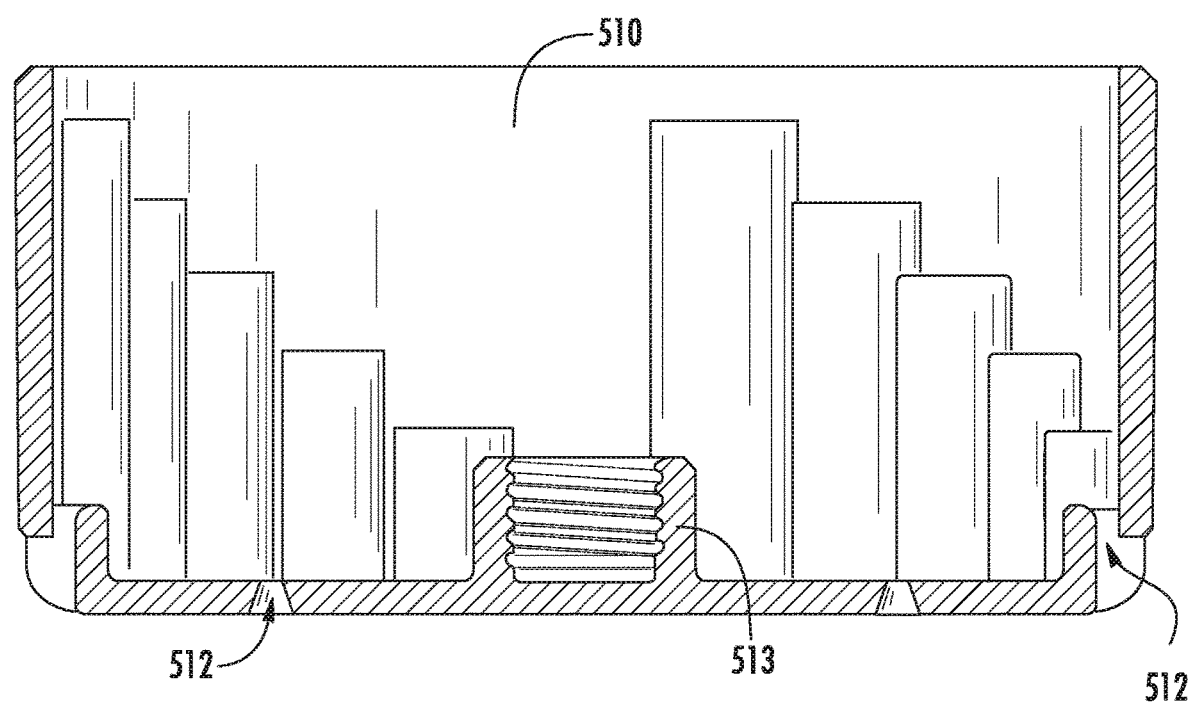
FIG. 20 is cross-sectional view of the lower housing of the suction side automatic drain system of FIG. 10.

The lower housing 510 may include one or more vents 512 that expose the interior of the lower housing to the outside environment. The vents 512 may be configured such that vapor or gas present in the interior of the lower housing may pass to the outside environment. The interior of the lower housing 510 may include an absorbent media 514. The absorbent media 514 may be any appropriate material, such as sponge or activated carbon. The absorbent media 514 may serve to absorb fluid drained from the fuel water separator filter system by the automated drain device, such that the fluid may evaporate through vents 512 over an extended period of time. The absorbent media 512 may reduce the contamination of the area surrounding the automatic drain device 500 by fluid released from the fuel water separator filter system. The absorbent media 514 may include a material for the treatment, such as a chemical treatment, of the fluid removed from the fuel water separator filter system. As shown in FIGS. 19 and 20, the lower housing 510 may include an attachment protrusion 513 configured to engage with the inner housing 530. The attachment protrusion 513 may include interior threads or other appropriate engagement mechanisms configured to attach the lower housing 510 to the inner housing 530.

The inner housing 530 engages with the upper housing 520, such that an interior portion of the automatic drain device 500 is formed between the upper housing and the inner housing. The inner housing 530 includes a drain opening 532 which allows fluid, such as water, to flow from the interior portion of the automatic drain device 500 to the interior of the lower housing 510. The volume of the interior portion of the automatic drain device 500 defines the maximum volume of water that may be drained from the fuel water separator filter system in a single drain operation. The inner housing 530 may be sealingly engaged with the upper housing 520. The seal between the inner housing 530 and the upper housing 520 may be produced by an o-ring or other resilient seal 534. In some embodiments, the inner housing 530 may be attached through a threaded engagement to the upper housing 520.

The solenoid 540 may be any suitable solenoid. In some embodiments, the solenoid 540 may include a double plunger 542. The double plunger 542 of the solenoid 540 may include an upper drain seal 545 and a lower drain seal 548, each disposed on opposite ends of the double plunger. The upper drain seal 545 is configured to prevent fluid flow through the drain opening 522 in the upper housing 520 when the solenoid 540 is in the closed position. A solenoid upper end cap 547 may be provided on the upper end of the solenoid plunger 542, and provide a support for the upper drain seal 545. An upper solenoid plunger extension 544 may be provided at the same end of the solenoid plunger 542 as the upper drain seal 545. An air vent seal 546 may be disposed on the upper solenoid plunger extension 544, and the air vent seal 546 is configured to prevent air flow through the air vent 524 when the solenoid 540 is in the closed position. The lower drain seal 548 is configured to prevent fluid flow through the drain opening 532 in the inner housing 530 when the solenoid 540 is in the open position. The upper drain seal 545, air vent seal 546 and lower drain seal 548 may be formed from any suitable material, such as an elastomer or other resilient polymer material. In other embodiments, the upper drain seal, air vent seal and lower drain seal may be fixed to the upper housing and inner housing, such that the double plunger may engage the seals and prevent flow through the associated openings.

A biasing member 570 is provided to maintain the solenoid plunger 542 in the closed position, except when the solenoid 540 is activated. The biasing member 570 may be a coil spring or another form of spring in various embodiments. The biasing member 570 provides a biasing force that maintains the solenoid plunger 542 in a closed position such that the upper drain seal 545 and air vent seal 546 prevent flow through the drain opening 522 and air vent 524, respectively. The activation of the solenoid 540 counteracts the biasing force of the biasing member 570, such that the solenoid plunger moves to the open position and flow is allowed through the drain opening 522 and air vent 524. Such an arrangement ensures that in the event of a failure of the solenoid 540 the automatic drain device 500 will be maintained in a closed position by the biasing force of the biasing member 570.

A biasing member 572 is provided between the solenoid end cap 547 and the solenoid extension 544. The biasing member 572 allows both the upper drain seal 545 and the air vent seal 546 to engage against their respective openings even when minor differences in the spacing of the drain opening 522 and air vent 524 occur. Such differences in spacing may result from manufacturing tolerances. The biasing member 572 may be a coil spring or another form of spring in various embodiments. The biasing member 572 provides a biasing force that maintains the air vent seal 546 in sealing engagement with the air vent 524 when the solenoid plunger is in the closed position and the solenoid extension 544 in engagement with the solenoid end cap when the solenoid is in the open position.

The controller 550 may be mounted to or in the upper housing 520. The controller 550 may be in electronic communication with one or more WIF sensors 554. The controller 550 is configured to operate the solenoid 540 based on the information received from the WIF sensors 554. The controller 550 may include a processor and memory, and may be programmed specifically to achieve the desired operation of the automatic drain device 500. The connections between the controller 550, the solenoid 540, and the WIF sensors 554 may be made without the use of external wiring, such that the connections are contained entirely within the automatic drain device 500. The controller 550 may also be connected by an electronic connector 593 to an electronic control module (ECM) of a vehicle or other machine in which the fuel water separator filter system is included, such that the activities of the automatic drain device 500 may be monitored by the ECM and error messages may be communicated from the controller 550 to the ECM. The upper housing 520 may include an opening 529 configured to receive the electronic connector 593, such that the connector 593 may engage the controller 550.

Figure 14:
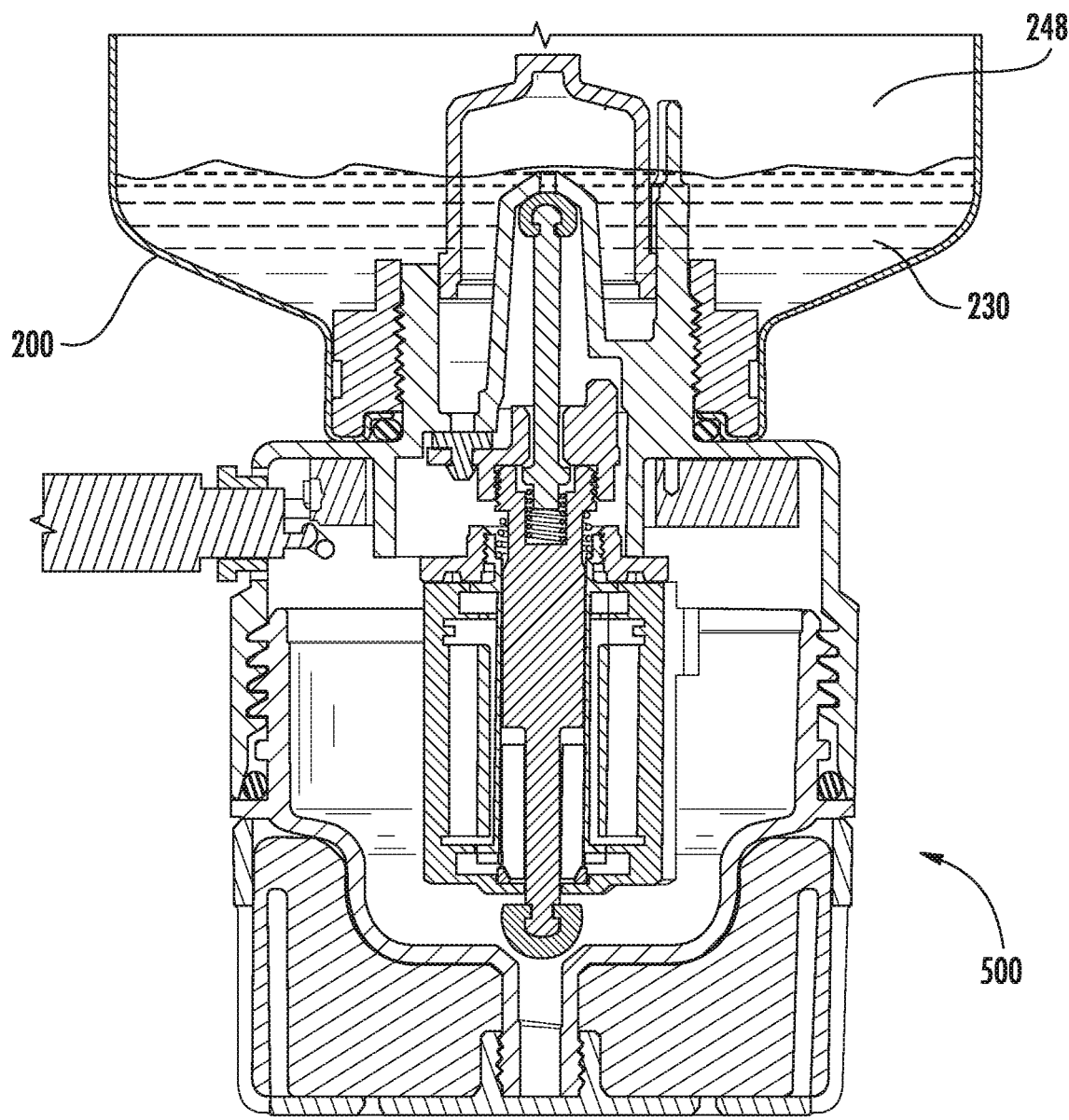
FIG. 14 is a cross-sectional view of the suction side automatic drain system of FIG. 10 in a closed position installed in a fuel water separator filter system.
Figure 15:
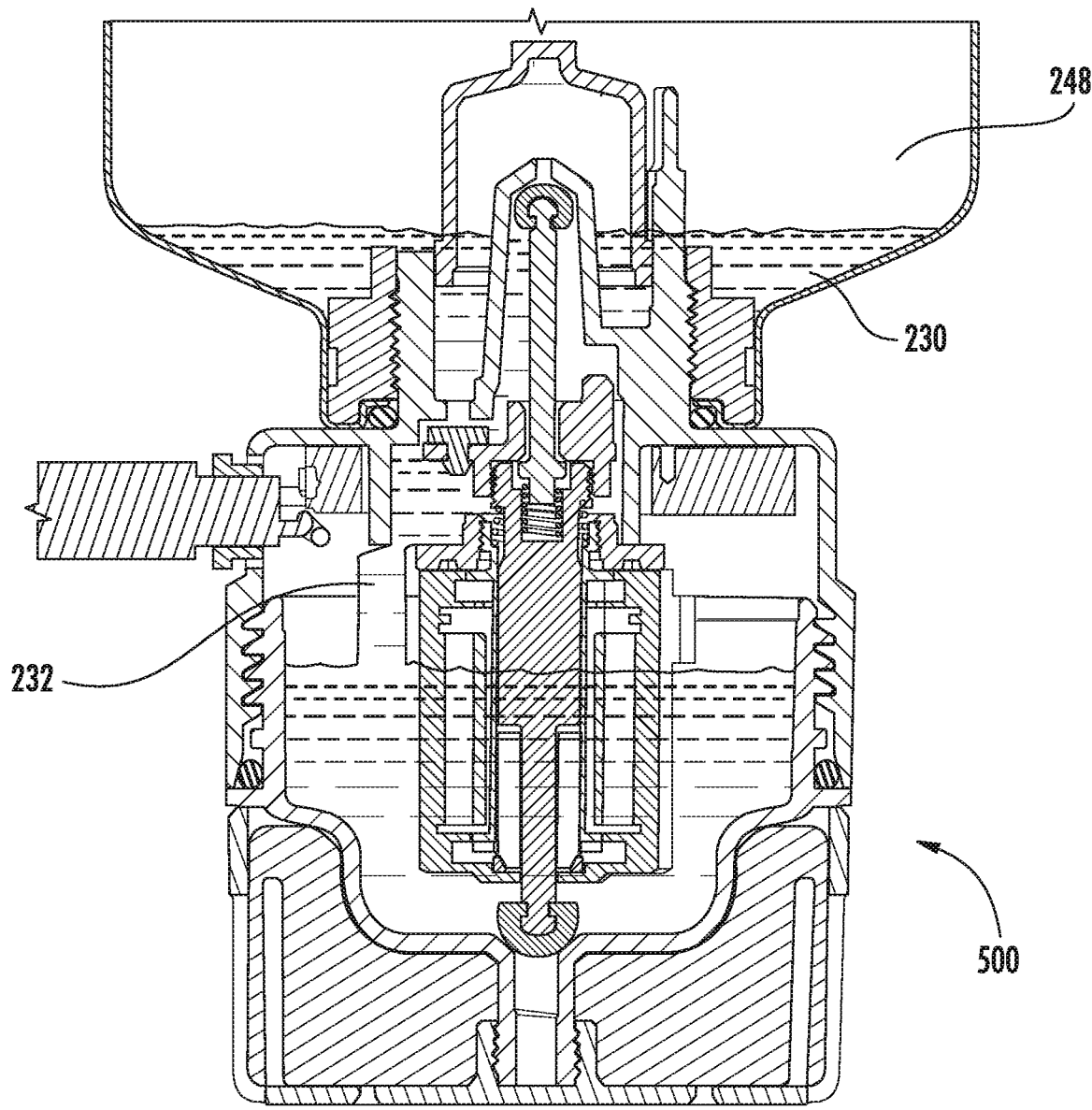
FIG. 15 is a cross-sectional view of the suction side automatic drain system of FIG. 10 in an open position installed in a fuel water separator filter system.
Figure 16:
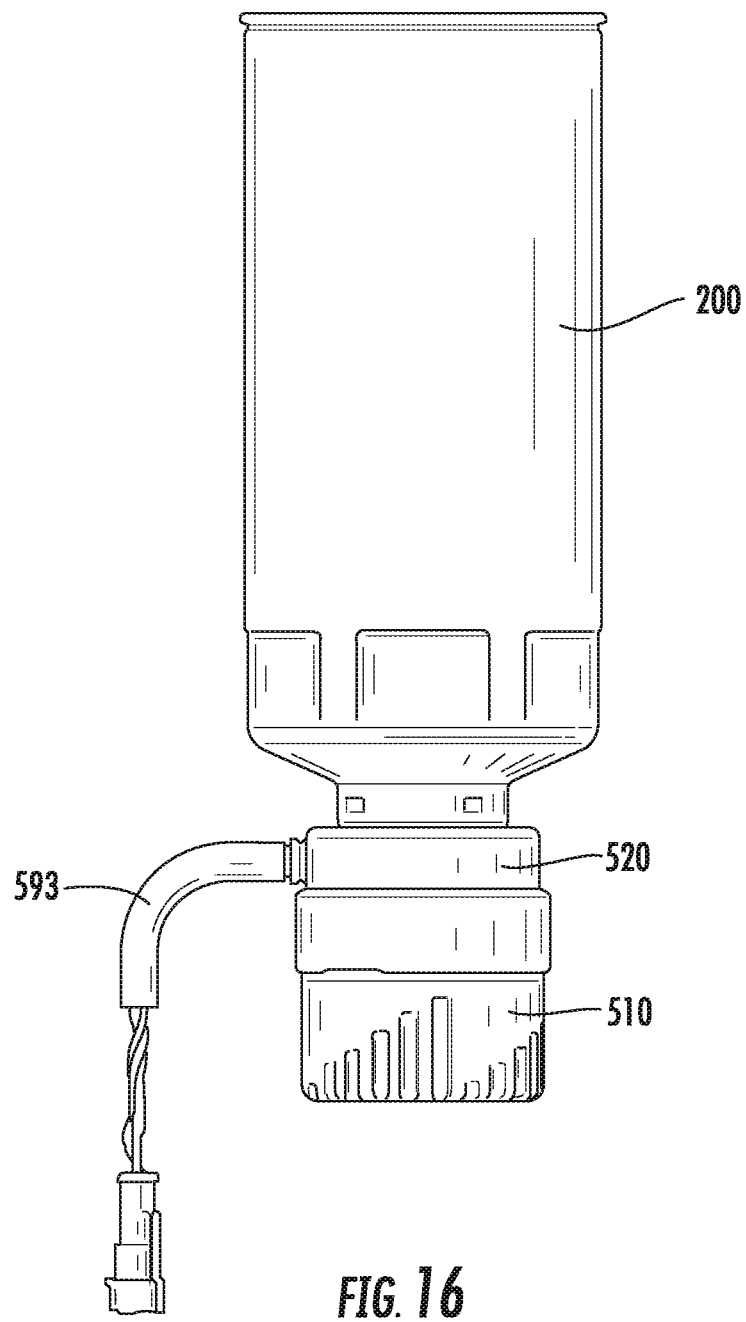
FIG. 16 is a side view of the suction side automatic drain system of FIG. 10 installed in a fuel water separator filter system.
Figure 17:
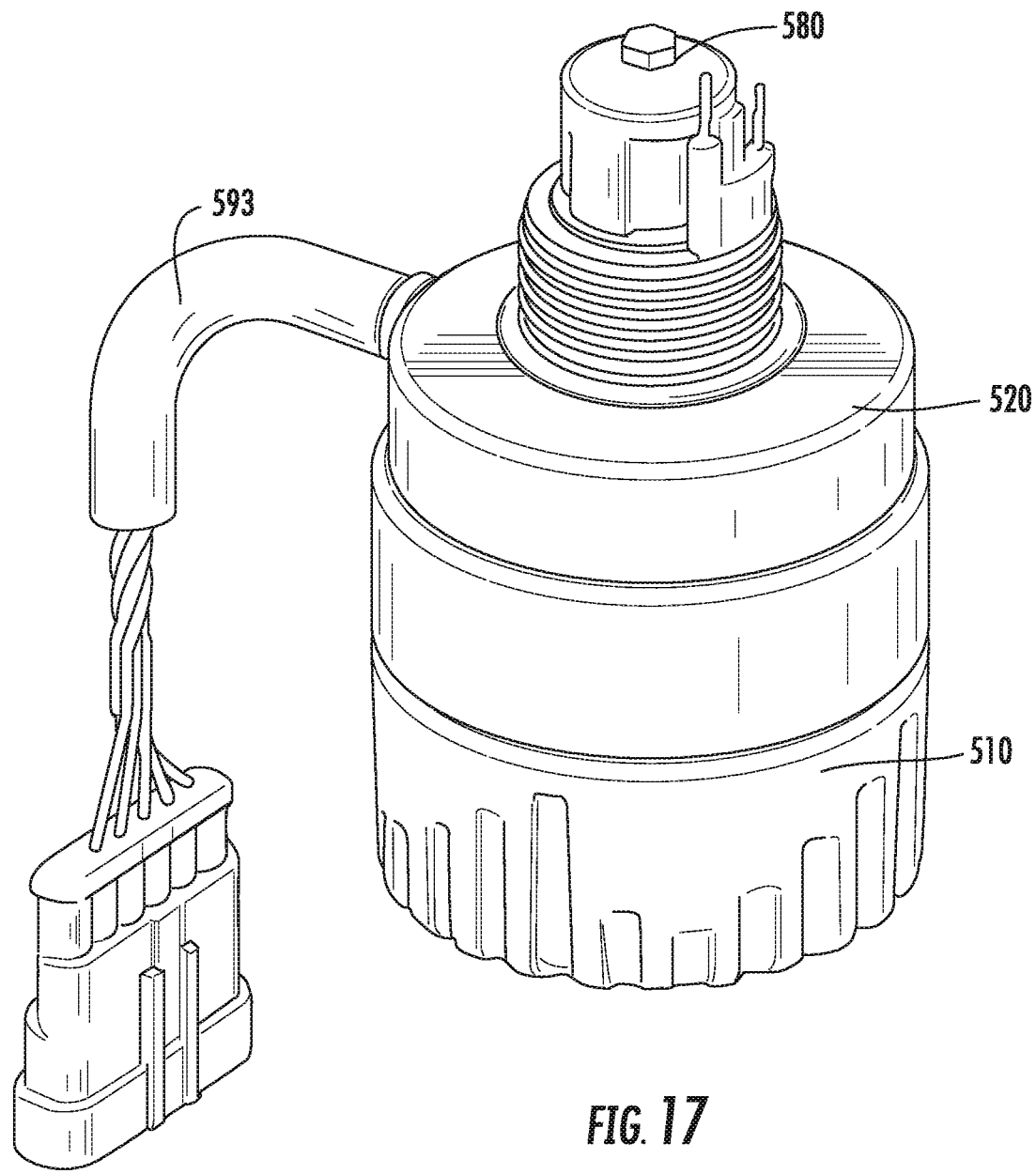
FIG. 17 is a perspective view of the suction side automatic drain system of FIG. 10.
Figure 18:
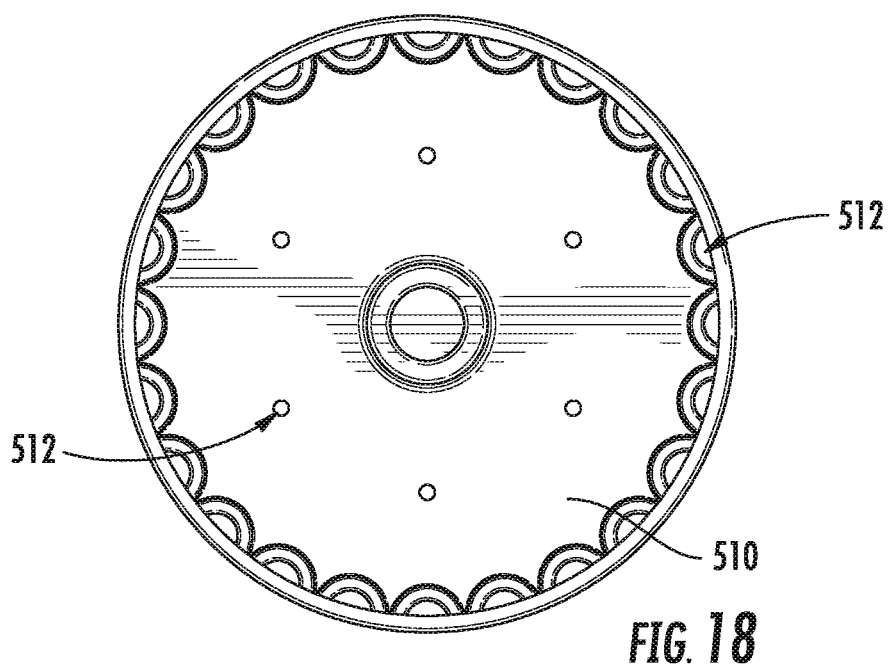
FIG. 18 is top-down view of the lower housing of the suction side automatic drain system of FIG. 10.

The controller 550 may be programmed such that when the WIF sensor 554 detects the presence of water, the automatic drain device 500 is activated. The detection of water by the WIF sensor 554 indicates that the water level in the water sump 230 of the fuel water separator filter system 200 has reached a level where draining is required. A condition in which the water sump 230 contains fuel 248 and water while the automatic drain device is in the closed position is shown in FIG. 14. The controller then activates the solenoid 540 by sending an electrical signal such that the solenoid plunger 542 is moved from the closed position. The solenoid plunger 542 is maintained in the open position for a predetermined amount of time, such that a desired amount of water is drained from the fuel water separator filter system through the drain opening 522 into the interior portion of the automatic drain device 500 formed between the upper housing 520 and the inner housing 510. A condition in which the automatic drain device 500 is in the open position and water 232 drains from the water sump of the fuel water separator filter system 200 to the interior portion of the automatic drain device 500 is shown in FIG. 15. After the desired amount of water is drained from the fuel water separator filter system, the controller 550 stops the activation of the solenoid 540 and the solenoid plunger 542 is returned to the closed position by the biasing force of the biasing member 570. The water that is present in the interior portion of the automatic drain device 500 then flows through the drain opening 532 and into the interior portion of the lower housing 510, such that the water is absorbed by the absorbent media 514. The absorbed water contained in the absorbent media 514 may then be released to the outside environment through the vents 512.

The upper housing 520 may include an attachment mechanism, such as external threads, that engage a corresponding portion 591 of the fuel water separator filter system. The attachment mechanism produces a seal between the automatic drain device 500 and the fuel water separator filter system. A seal element 592 may be provided on the upper housing 520 to ensure a fluid tight seal is formed between the automatic drain device 500 and the fuel water separator filter system.

Figure 21:
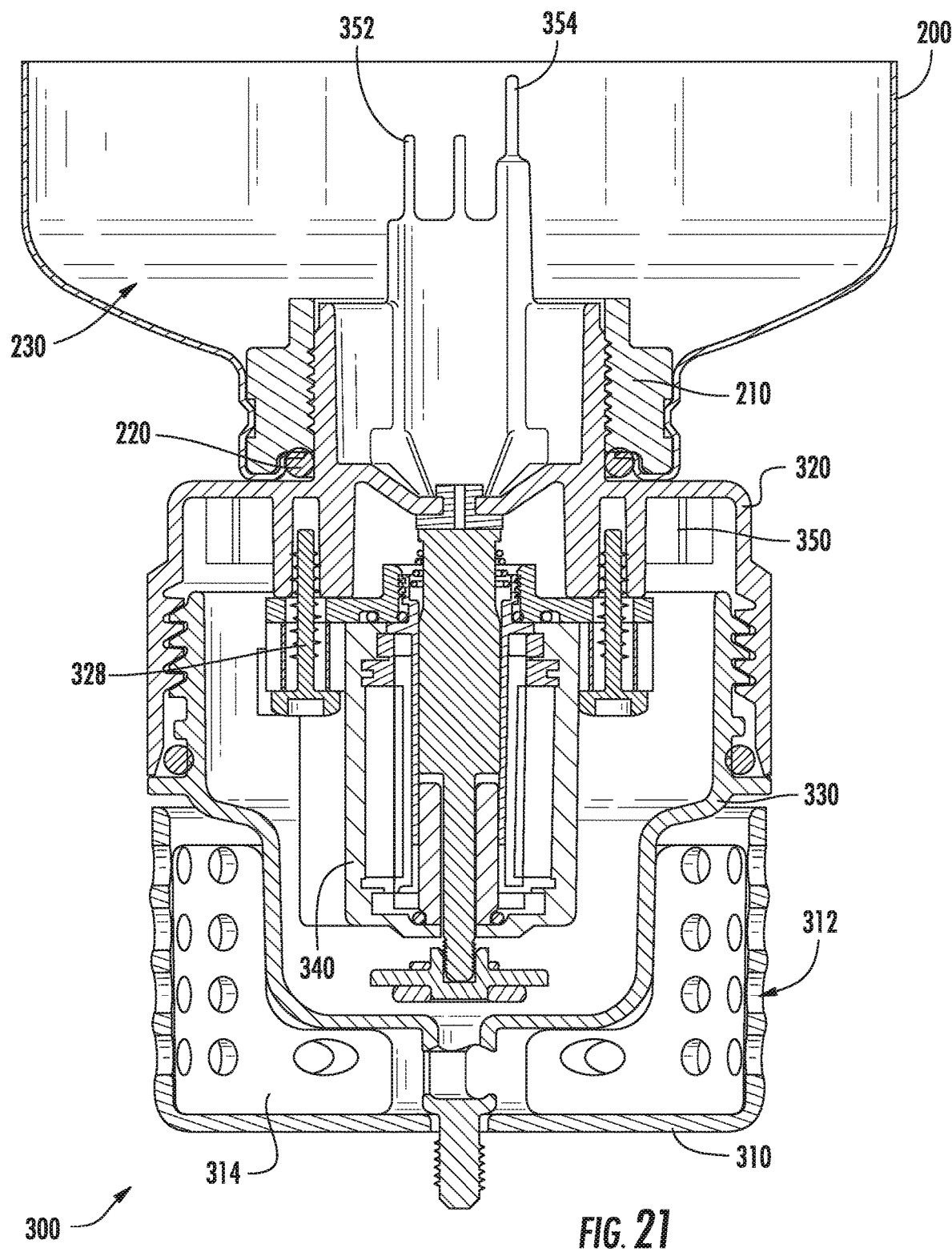
FIG. 21 is a cross-sectional view of a pressure side automatic drain system installed in a fuel water separator filter system, according to an embodiment.
Figure 22:
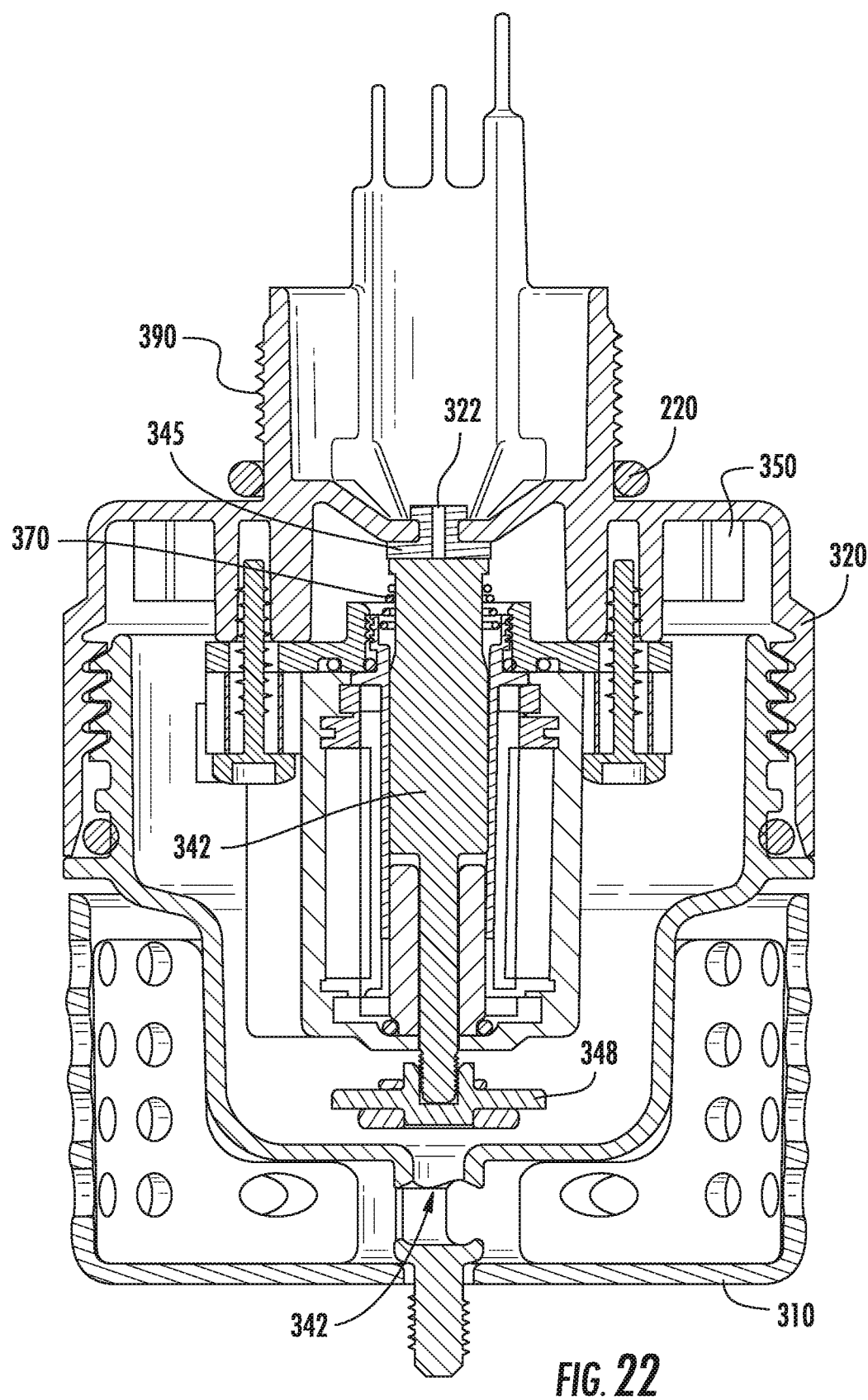
FIG. 22 is a cross-sectional view of the pressure side automatic drain system of FIG. 21 in a closed position.
Figure 23:
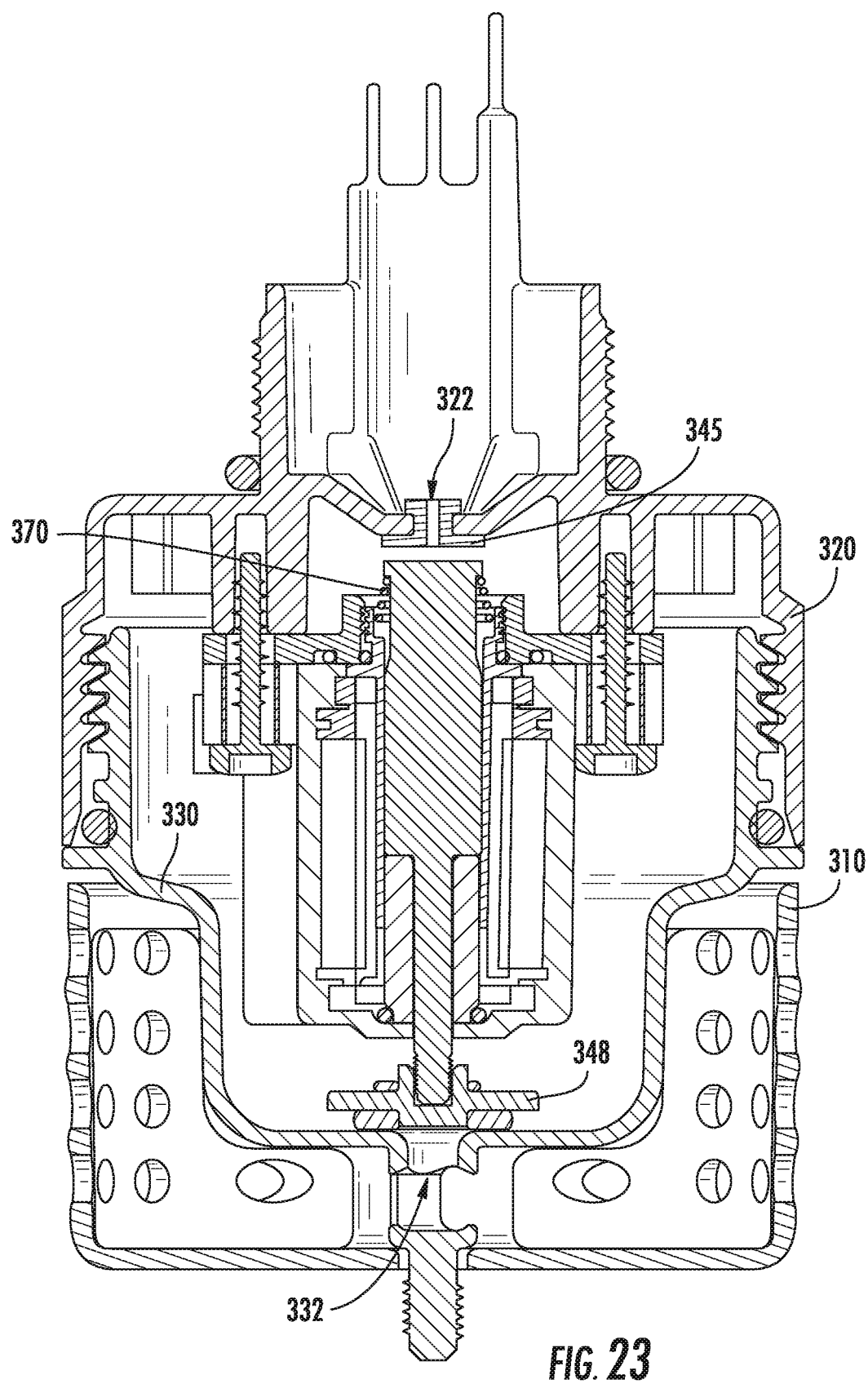
FIG. 23 is a cross-sectional view of the pressure side automatic drain system of FIG. 21 in an open position.
Figure 24:
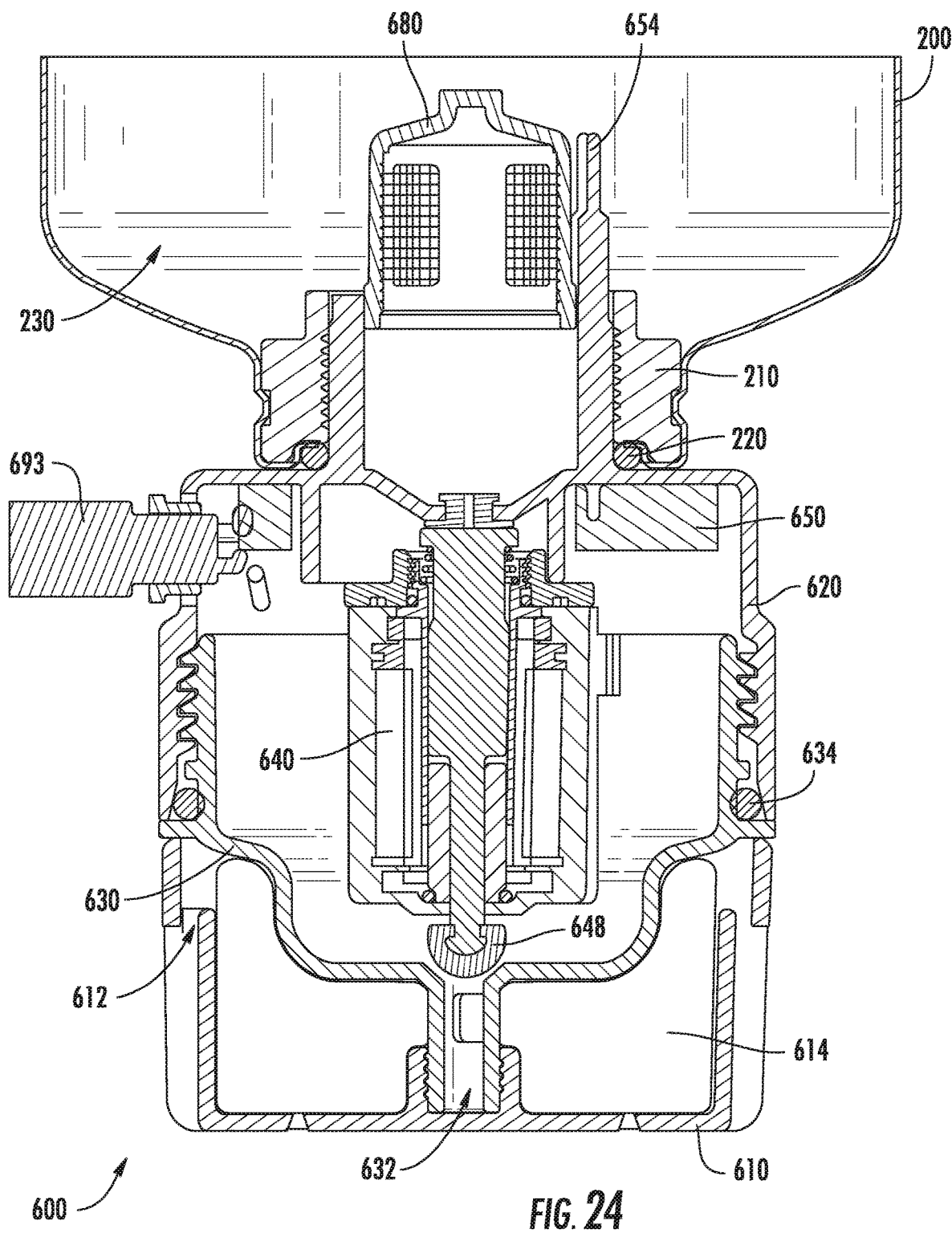
FIG. 24 is a cross-sectional view of a pressure side automatic drain system installed in a fuel water separator filter system, according to an embodiment.
Figure 25:
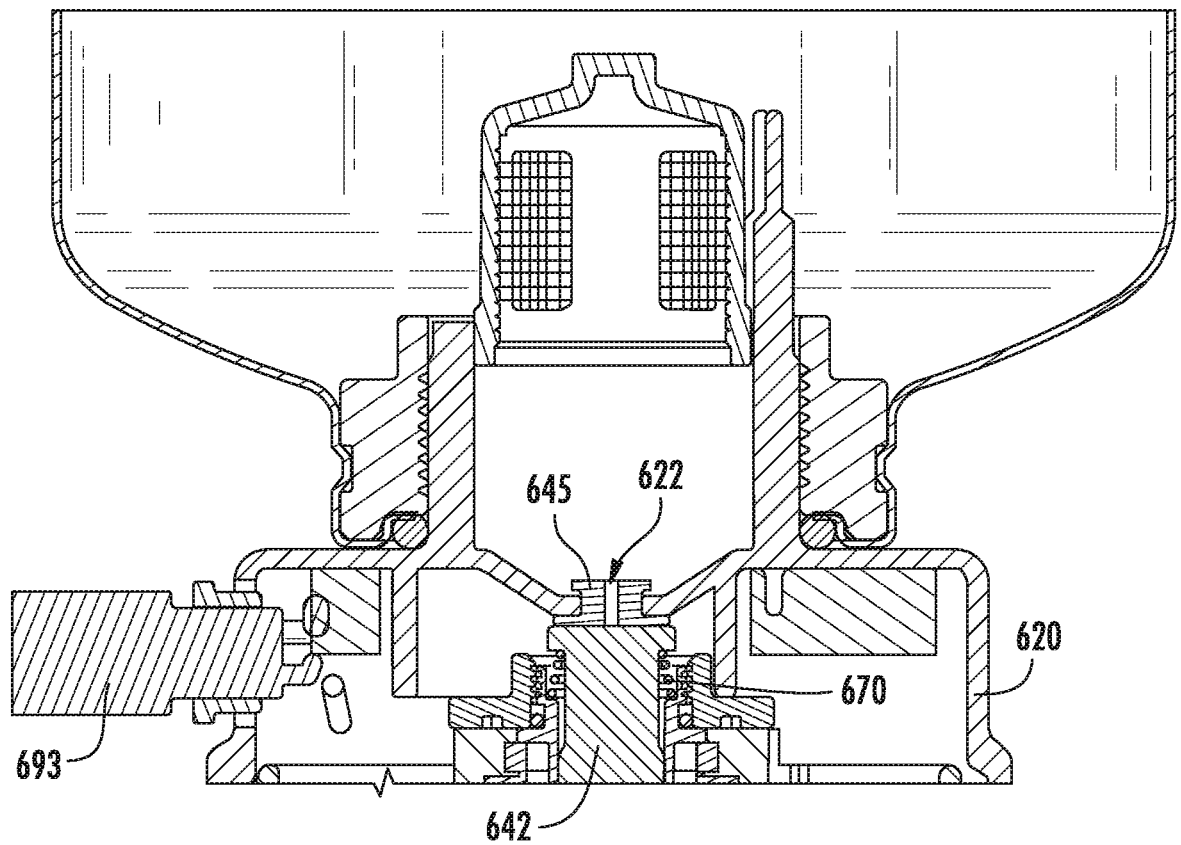
FIG. 25 is a detailed cross-sectional view of a portion of the pressure side automatic drain system of FIG. 24.
Figure 26:
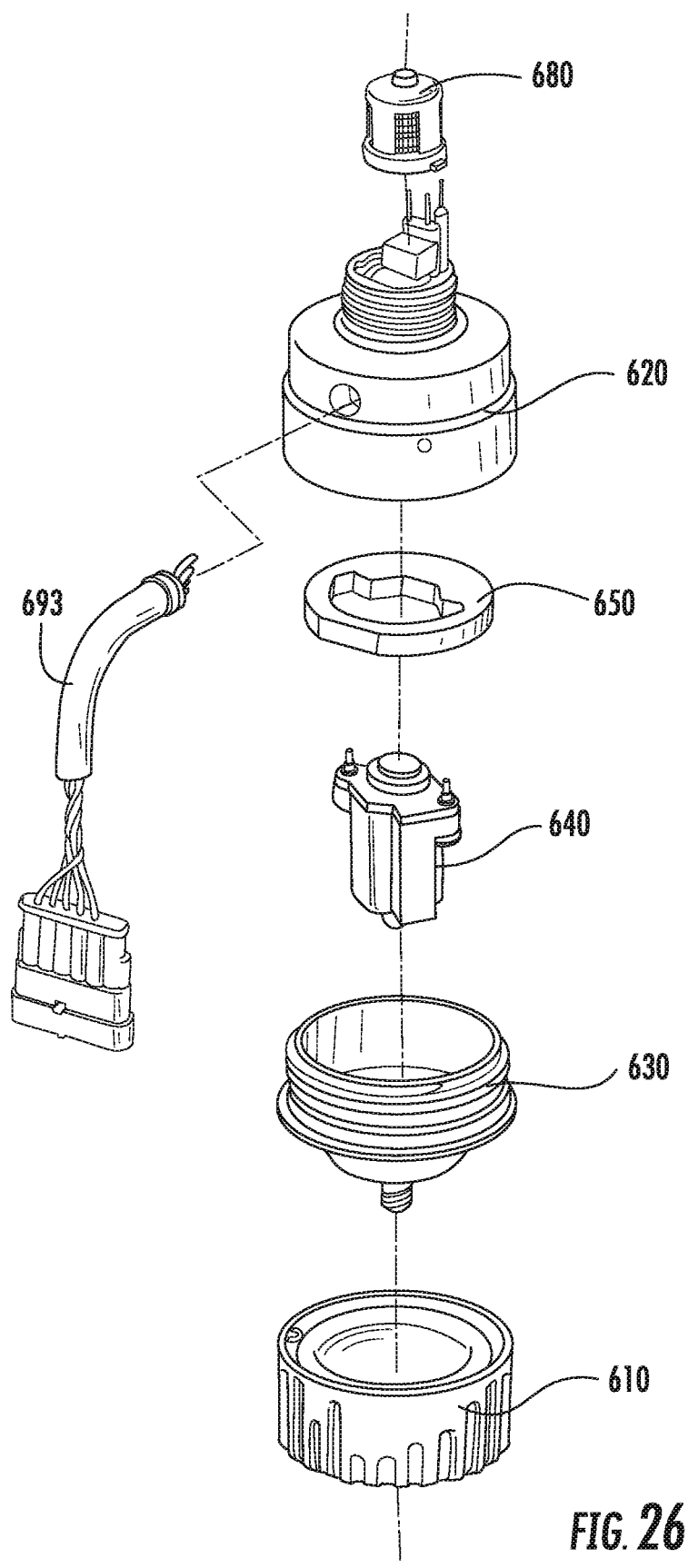
FIG. 26 is an exploded perspective view of the pressure side automatic drain system of FIG. 24.
Figure 27:
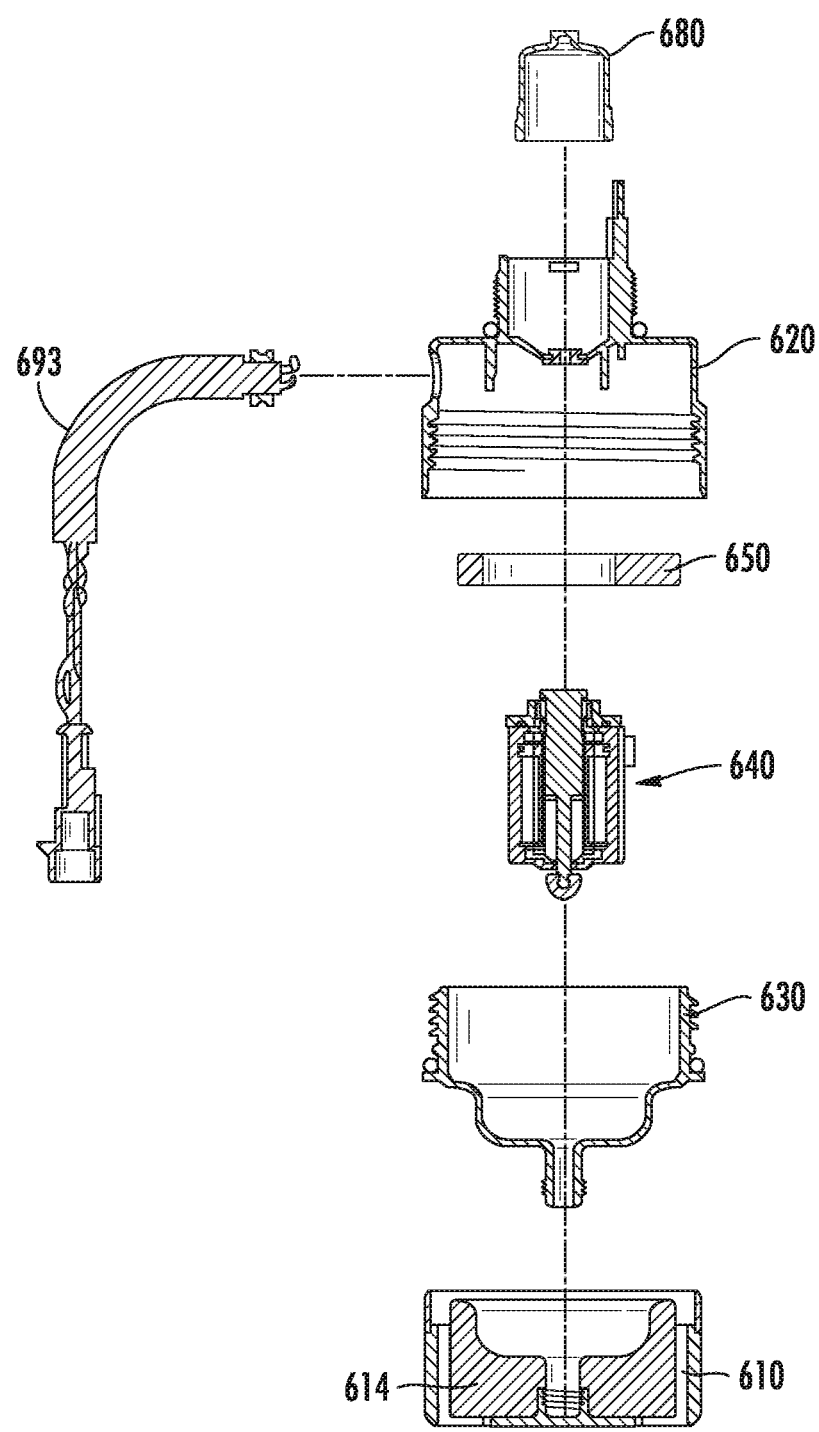
FIG. 27 is an exploded cross-sectional view of the pressure side automatic drain system of FIG. 24.

With reference to FIGS. 21-23, an automatic drain device 300 is illustrated for use with a fuel water separator filter located on a pressure side of a fuel pump. The automatic drain device 300 includes a lower housing 310 and an upper housing 320. An inner housing 330 is located within and between the upper housing 320 and the lower housing 310. A controller 350 is included in the automatic drain device 300 and is connected to a solenoid 340. The automatic drain device 300 may include a connecting mechanism 390 to connect the automatic drain device to a fuel water separator filter system 200 such that a water sump 230 of the fuel water separator filter system is in fluid communication with the automatic drain device. The connecting mechanism 390 of the automatic drain device 300 may engage a corresponding connecting mechanism 210 of the fuel water separator filter system 200. In some embodiments, the connecting mechanism 390 of the automatic drain device 300 may be threads and the connecting mechanism 210 of the fuel water separator system 200 may be threads configured to engage the threads of the automatic drain device. A seal 220 may be provided on the fuel water separator filter system 200 or on the automatic drain device 300 to produce a fluid-tight seal between these components. The seal 220 may be any appropriate seal, such as an o-ring.

The upper housing 320 includes at least one drain opening 322. The drain opening 322 allows fluid, such as water, to flow from the water sump 230 of the fuel water separator to an interior portion of the automatic drain device 300.

The lower housing 310 may include one or more vents 312 that expose the interior of the lower housing to the outside environment. The vents 312 may be configured such that vapor or gas present in the interior of the lower housing may pass to the outside environment. The interior of the lower housing 310 may include an absorbent media 314. The absorbent media 314 may be any appropriate material, such as sponge or activated carbon. The absorbent media 314 may serve to absorb fluid drained from the fuel water separator filter system by the automated drain device, such that the fluid may evaporate through vents 312 over an extended period of time. The absorbent media 312 may reduce the contamination of the area surrounding the automatic drain device 300 by fluid released from the fuel water separator filter system. The absorbent media 314 may include a material for the treatment, such as a chemical treatment, of the fluid removed from the fuel water separator filter system.

The inner housing 330 engages with the upper housing 320, such that an interior portion of the automatic drain device 300 is formed between the upper housing and the inner housing. The inner housing 330 includes a drain opening 332 which allows fluid, such as water, to flow from the interior portion of the automatic drain device 300 to the interior of the lower housing 310. The volume of the interior portion of the automatic drain device 300 defines the maximum volume of water that may be drained from the fuel water separator filter system in a single drain operation. The inner housing 330 may be sealingly engaged with the upper housing 320. The seal between the inner housing 330 and the upper housing 320 may be produced by an o-ring or other resilient seal. In some embodiments, the inner housing 330 may be attached to the upper housing 320 and the lower housing 310. For example, the inner housing 330 and the upper housing 320 may be attached through a threaded engagement, and the inner housing 330 may be attached directly to the lower housing 330. The lower housing 310 may be attached indirectly to the upper housing 320 through the inner housing 330.

The solenoid 340 may be any suitable solenoid. In some embodiments, the solenoid 340 may include a double plunger 342. The double plunger 342 of the solenoid 340 may include a lower drain seal 348 disposed on an end of the double plunger adjacent to the drain opening 332. The lower drain seal 348 is configured to prevent fluid flow through the drain opening 332 in the inner housing 330 when the solenoid 340 is in the open position. An upper drain seal 345 may be disposed on the upper housing 320 and be configured to prevent fluid flow through the drain opening 322 when the solenoid 340 is in the closed position and an upper portion of the solenoid plunger 342 engages the upper drain seal 345. The upper drain seal 345 and lower drain seal 348 may be formed from any suitable material, such as an elastomer or other resilient polymer material. In other embodiments, the upper drain seal may be fixed to the upper end of the solenoid plunger 342, such that the upper drain seal may prevent fluid flow through the upper drain opening 322 when the double plunger is in the closed position. In still other embodiments, the lower drain seal may be fixed to the inner housing such that the double plunger 342 may engage the lower drain seal to prevent flow through the lower drain opening 332 when the solenoid plunger is in the open position. The solenoid 340 may be secured to the upper housing 320 by at least one attachment mechanism 328, such as screws.

A biasing member 370 is provided to maintain the solenoid plunger 342 in the closed position, except when the solenoid 340 is activated. The biasing member 370 may be a coil spring or another form of spring in various embodiments. The biasing member 370 provides a biasing force that maintains the solenoid plunger 342 in a closed position such that the upper drain seal 345 and solenoid plunger 342 prevent flow through the drain opening 322. The activation of the solenoid 340 counteracts the biasing force of the biasing member 370, such that the solenoid plunger moves to the open position and flow is allowed through the drain opening 322. Such an arrangement ensures that in the event of a failure of the solenoid 340 the automatic drain device 300 will be maintained in a closed position by the biasing force of the biasing member 370.

The controller 350 may be mounted to or in the upper housing 320. The controller 350 may be in electronic communication with a lower water-in-fuel (WIF) sensor 352 and an upper WIF sensor 354. The controller 350 is configured to operate the solenoid 340 based on the information received from at least the lower WIF sensor 352. The controller 350 may include a processor and memory, and may be programmed specifically to achieve the desired operation of the automatic drain device 300. The connections between the controller 350, the solenoid 340, the lower WIF sensor 352 and the upper WIF sensor 354 may be made without the use of external wiring, such that the connections are contained entirely within the automatic drain device 300. The controller 350 may also be connected to an electronic control module (ECM) of a vehicle or other machine in which the fuel water separator filter system is included, such that the activities of the automatic drain device 300 may be monitored by the ECM and error messages may be communicated from the controller 350 to the ECM.

The controller 350 may be programmed such that when the lower WIF sensor 352 detects the presence of water the automatic drain device 300 is activated. The detection of water by the lower WIF sensor 352 indicates that the water level in the water sump of the fuel water separator filter system has reached a level where draining is required. The controller then activates the solenoid 340 by sending an electrical signal such that the solenoid plunger 342 is moved from the closed position, as shown in FIG. 22, to the open position, as shown in FIG. 23. The solenoid plunger 342 is maintained in the open position for a predetermined amount of time, such that a desired amount of water is drained from the fuel water separator filter system through the drain opening 322 into the interior portion of the automatic drain device 300 formed between the upper housing 320 and the inner housing 310. The flow of water from the water sump 230 to the automatic drain device 300 is motivated by the relatively high pressure in the fuel water separator filter system compared to the automatic drain device. After the desired amount of water is drained from the fuel water separator filter system, the controller 350 stops the activation of the solenoid 340 and the solenoid plunger 342 is returned to the closed position by the biasing force of the biasing member 370. The water that is present in the interior portion of the automatic drain device 300 then flows through the drain opening 332 and into the interior portion of the lower housing 310, such that the water is absorbed by the absorbent media 314. The absorbed water contained in the absorbent media 314 may then be released to the outside environment through the vents 312.

With reference to FIGS. 24-29, another automatic drain device 600 is illustrated for use with a fuel water separator filter located on a pressure side of a fuel pump. The automatic drain device 600 includes a lower housing 610 and an upper housing 620. An inner housing 630 is located within and between the upper housing 620 and the lower housing 610. A controller 650 is included in the automatic drain device 600 and is connected to a solenoid 640. The automatic drain device 600 may include a connecting mechanism to connect the automatic drain device to a fuel water separator filter system 200 such that a water sump 230 of the fuel water separator filter system is in fluid communication with the automatic drain device. The connecting mechanism of the automatic drain device 600 may engage a corresponding connecting mechanism 210 of the fuel water separator filter system 200. In some embodiments, the connecting mechanism of the automatic drain device 600 may be threads and the connecting mechanism 210 of the fuel water separator system 200 may be threads configured to engage the threads of the automatic drain device. A seal 220 may be provided on the fuel water separator filter system 200 or on the automatic drain device 600 to produce a fluid-tight seal between these components. The seal 220 may be any appropriate seal, such as an o-ring.

The upper housing 620 includes at least one drain opening 622. The drain opening 622 allows fluid, such as water, to flow from the water sump 230 of the fuel water separator to an interior portion of the automatic drain device 600. The upper housing 620 may include an opening 629 configured to receive an electronic connector 693, such that the connector 693 may engage the controller 650.

The upper housing 620 may engage with a strainer element 680. The strainer element 680 may be configured to prevent debris present in the fuel water separator system from entering the automatic drain device 600. Such debris may result in the blockage of the drain openings or interfere with the sealing of the drain openings, preventing the desired operation characteristics of the automatic drain device 600. The strainer 680 may include a cage or frame like structure, openings in which are provided with a filtration media. The filtration media of the strainer 680 may be any appropriate filtration media, such as a wire or polymer mesh. The strainer 680 may be removable from the automatic drain device 400 for cleaning or replacement.

The lower housing 610 may include one or more vents 612 that expose the interior of the lower housing to the outside environment. The vents 612 may be configured such that vapor or gas present in the interior of the lower housing may pass to the outside environment. The interior of the lower housing 610 may include an absorbent media 614. The absorbent media 614 may be any appropriate material, such as sponge or activated carbon. The absorbent media 614 may serve to absorb fluid drained from the fuel water separator filter system by the automated drain device, such that the fluid may evaporate through vents 612 over an extended period of time. The absorbent media 612 may reduce the contamination of the area surrounding the automatic drain device 600 by fluid released from the fuel water separator filter system. The absorbent media 614 may include a material for the treatment, such as a chemical treatment, of the fluid removed from the fuel water separator filter system.

The inner housing 630 engages with the upper housing 620, such that an interior portion of the automatic drain device 600 is formed between the upper housing and the inner housing. The inner housing 630 includes a drain opening 632 which allows fluid, such as water, to flow from the interior portion of the automatic drain device 600 to the interior of the lower housing 610. The volume of the interior portion of the automatic drain device 600 defines the maximum volume of water that may be drained from the fuel water separator filter system in a single drain operation. The inner housing 630 may be sealingly engaged with the upper housing 620. The seal between the inner housing 630 and the upper housing 620 may be produced by an o-ring or other resilient seal 634. In some embodiments, the inner housing 630 may be attached to the upper housing 620 and the lower housing 610. For example, the inner housing 630 and the upper housing 620 may be attached through a threaded engagement, and the inner housing 630 may be attached to the lower housing 610. The lower housing 610 may be attached indirectly to the upper housing 620 through the inner housing 630.

The solenoid 640 may be any suitable solenoid. In some embodiments, the solenoid 640 may include a double plunger 642. The double plunger 642 of the solenoid 640 may include a lower drain seal 648 disposed on an end of the double plunger adjacent to the drain opening 632. The lower drain seal 648 is configured to prevent fluid flow through the drain opening 632 in the inner housing 630 when the solenoid 640 is in the open position. An upper drain seal 645 may be disposed on the upper housing 620 and be configured to prevent fluid flow through the drain opening 622 when the solenoid 640 is in the closed position and an upper portion of the solenoid plunger 642 engages the upper drain seal 645. The upper drain seal 645 and lower drain seal 648 may be formed from any suitable material, such as an elastomer or other resilient polymer material. In other embodiments, the upper drain seal may be fixed to the upper end of the solenoid plunger 642, such that the upper drain seal may prevent fluid flow through the upper drain opening 622 when the double plunger is in the closed position. In still other embodiments, the lower drain seal may be fixed to the inner housing such that the double plunger 642 may engage the lower drain seal to prevent flow through the lower drain opening 632 when the solenoid plunger is in the open position. The solenoid 640 may be secured to the upper housing 320 by any appropriate attachment mechanism.

A biasing member 670 is provided to maintain the solenoid plunger 642 in the closed position, except when the solenoid 640 is activated. The biasing member 670 may be a coil spring or another form of spring in various embodiments. The biasing member 670 provides a biasing force that maintains the solenoid plunger 642 in a closed position such that the upper drain seal 645 and solenoid plunger 642 prevent flow through the drain opening 622. The activation of the solenoid 640 counteracts the biasing force of the biasing member 670, such that the solenoid plunger moves to the open position and flow is allowed through the drain opening 622. Such an arrangement ensures that in the event of a failure of the solenoid 640 the automatic drain device 600 will be maintained in a closed position by the biasing force of the biasing member 670.

The controller 650 may be mounted to or in the upper housing 620. The controller 650 may be in electronic communication with one or more water-in-fuel (WIF) sensors 654. The controller 650 is configured to operate the solenoid 640 based on the information received from the WIF sensor 654. The controller 650 may include a processor and memory, and may be programmed specifically to achieve the desired operation of the automatic drain device 600. The connections between the controller 650, the solenoid 640, and the WIF sensor 654 may be made without the use of external wiring, such that the connections are contained entirely within the automatic drain device 600. The controller 650 may also be connected by the electronic connector 693 to an electronic control module (ECM) of a vehicle or other machine in which the fuel water separator filter system is included, such that the activities of the automatic drain device 600 may be monitored by the ECM and error messages may be communicated from the controller 650 to the ECM.

Figure 28:
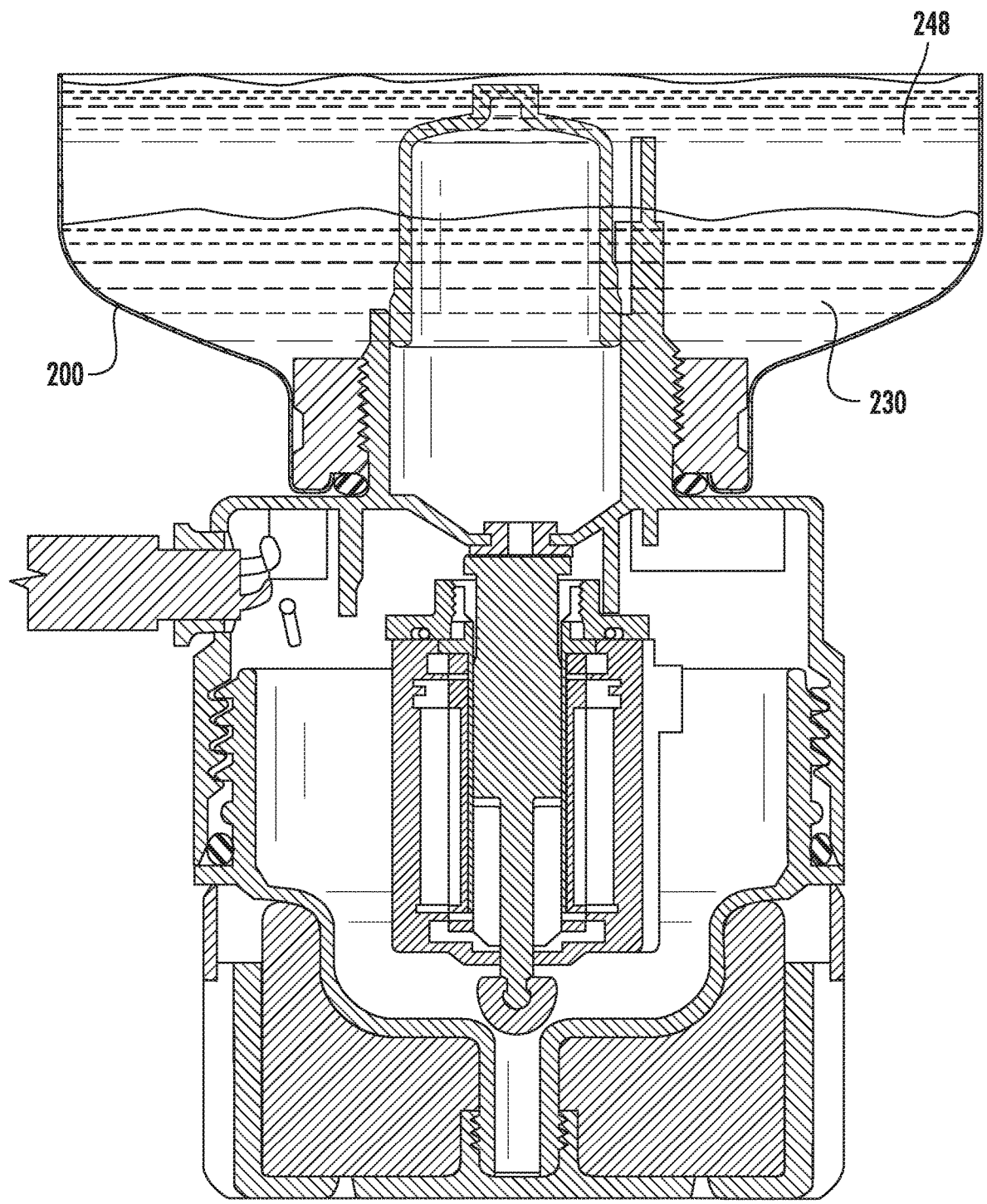
FIG. 28 is a cross-sectional view of the pressure side automatic drain system of FIG. 24 in a closed position installed in a fuel water separator filter system.
Figure 29:
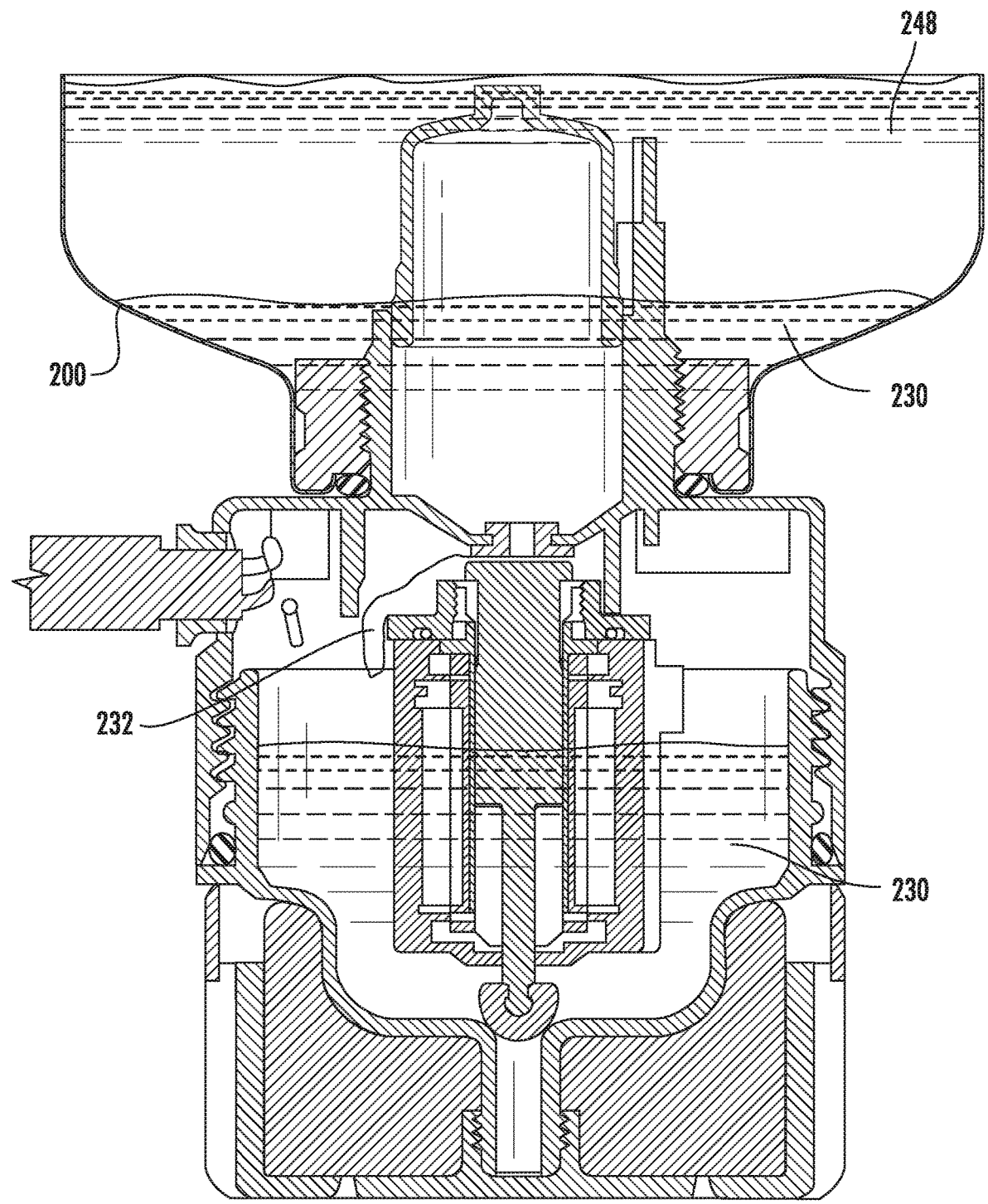
FIG. 29 is a cross-sectional view of the pressure side automatic drain system of FIG. 24 in an open position installed in a fuel water separator filter system.

The controller 650 may be programmed such that when the WIF sensor 652 detects the presence of water the automatic drain device 600 is activated. The detection of water by the WIF sensor 652 indicates that the water level in the water sump of the fuel water separator filter system has reached a level where draining is required. The controller then activates the solenoid 640 by sending an electrical signal such that the solenoid plunger 642 is moved from the closed position, as shown in FIG. 28, to the open position, as shown in FIG. 29. The solenoid plunger 642 is maintained in the open position for a predetermined amount of time, such that a desired amount of water is drained from the fuel water separator filter system through the drain opening 622 into the interior portion of the automatic drain device 600 formed between the upper housing 620 and the inner housing 610. The flow of water 232 from the water sump 230 to the automatic drain device 600 is motivated by the relatively high pressure in the fuel water separator filter system compared to the automatic drain device. After the desired amount of water 232 is drained from the fuel water separator filter system, the controller 650 stops the activation of the solenoid 640 and the solenoid plunger 642 is returned to the closed position by the biasing force of the biasing member 670. The amount of water 232 that is removed from the fuel water separator is selected to ensure that fuel 248 does not enter the automatic drain device 600 from the fuel water separator filter system 200. The water 232 that is present in the interior portion of the automatic drain device 600 then flows through the drain opening 632 and into the interior portion of the lower housing 610, such that the water is absorbed by the absorbent media 614. The absorbed water contained in the absorbent media 614 may then be released to the outside environment through the vents 612.

Figure 30:
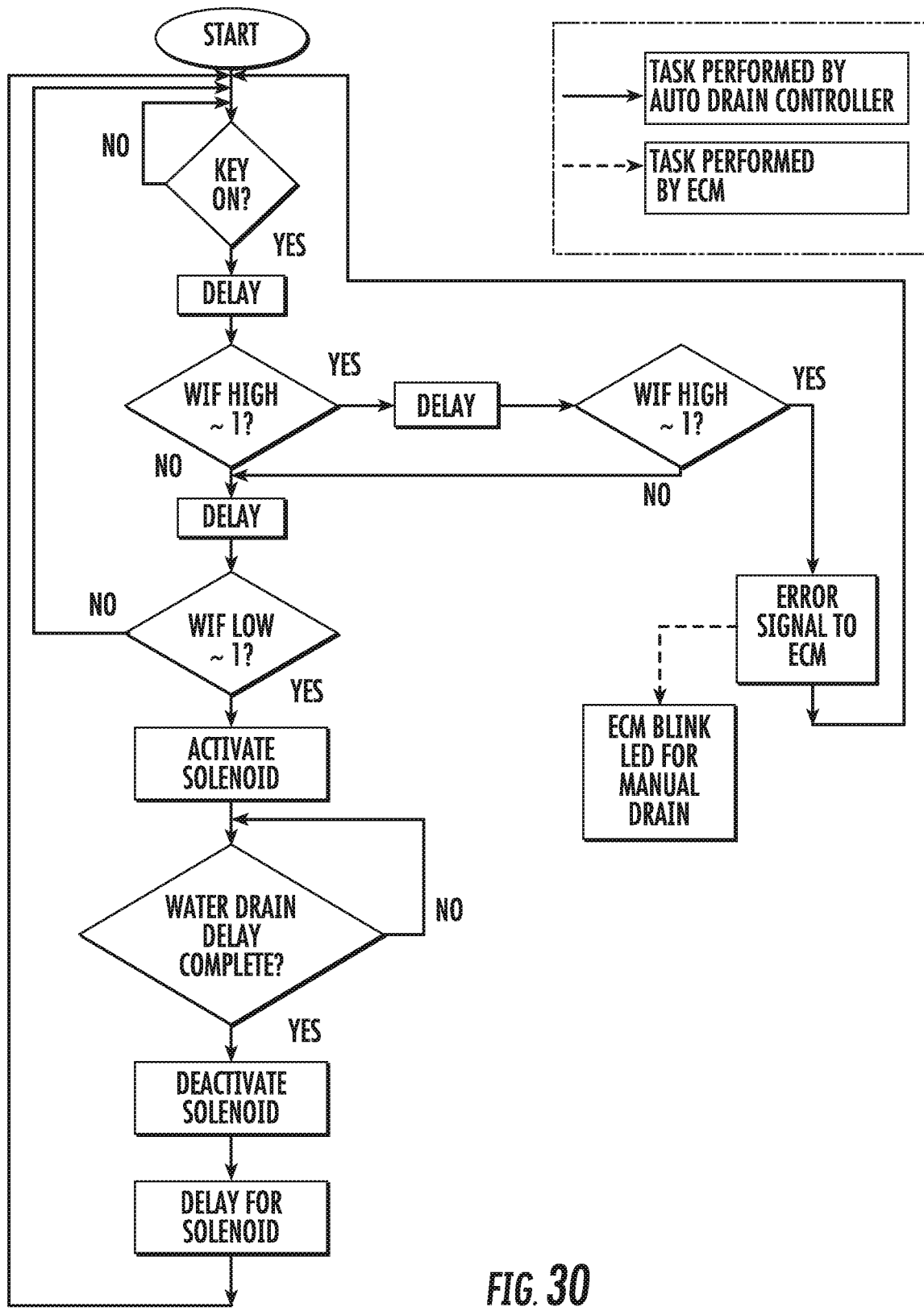
FIG. 30 is a flow chart representing the operation of an exemplary automatic drain system.

An exemplary flow chart for the operation of the automatic drain devices described herein is provided in FIG. 30. The operation of the automatic drain device first includes a check by the controller of the device to determine whether a key of the vehicle or machine in which the device is disposed is in the on position. Such a determination may be made based on an electrical signal received by the controller, and may be true independent of whether the vehicle or machine is in operation. For example, the key of a vehicle including the automatic drain device may be in the on position but the engine of the vehicle may not be running. Alternatively, the key of a vehicle including the automatic drain device may be in the on position while the engine of the vehicle is running. If the key is in the on position, the controller then determines if the upper WIF sensor detects water after a predetermined delay period.

In the event that the upper WIF sensor does not return a water detected signal, the controller proceeds to determine the state of the lower WIF sensor. When the lower WIF sensor does not detect water, the controller restarts the process. If the state of the lower WIF sensor indicates that water is present, the controller sends an activation signal to the solenoid to place the automatic drain device in the open position. The controller maintains the solenoid in an active state until a predetermined water drain delay period has elapsed. The water drain delay period may be selected to correspond to the time necessary for an interior volume of the automatic drain device to fill with water from the fuel water separator filter system. After the deactivation of the solenoid, the automatic drain device returns to the closed position and the water contained in the interior of the automatic drain device may be released to the environment, such as by evaporation after being absorbed by an absorbent media contained in the automatic drain device. The controller then restarts the process after an appropriate delay period.

When the upper WIF sensor indicates that water has been detected, the controller delays for a predetermined period of time and rechecks the upper WIF sensor. If after the delay the upper WIF sensor does not indicate that water has been detected, the controller proceeds to check the status of the lower WIF sensor as described above. In the case that the upper WIF sensor still indicates that water has been detected after the delay, the controller sends an error signal to the ECM of the vehicle or machine in which the automatic drain device is disposed. The ECM may then inform a user of an error and a need to manually drain the water sump of the fuel water separator. The ECM may inform the user of the error by any appropriate method, such as an indicator light or status message on a user interface. The detection of water at the upper WIF sensor may indicate a malfunction of the automatic drain device.

The automatic drain device, according to various embodiments described herein, avoids issues that arise when a user is unaware of the requirement that a water sump of a fuel water separator be drained periodically. The automatic nature of the drain device removes the draining from dependence on the user, and may avoid malfunctions and damage associated with a failure to drain the water sump. Additionally, the automatic drain device allows the water sump to be drained while the fuel water separator system is in operation. For example, the automatic drain device allows the water sump to be drained while an engine supplied by the fuel water separator system is in operation.

The automatic drain device may be a self-contained unit, such that the device may be utilized in conjunction with pre-existing fuel water separator filter systems. The controller of the device may be capable of fully independent operation, such that no modifications to an ECM of an engine supplied by the fuel water separator system. In such embodiments, the automatic drain device may not include any external wires or connections with a wiring harness. Additionally, the independent nature of the automatic drain device allows the device to be employed with both electronically controlled and mechanically controlled engine systems. In other embodiments, the controller of the device may be configured to interface with an ECM of an electronically controlled engine system, such that the ECM can monitor the draining activities of the device and the device can supply error messages to the ECM for user notification.

The two-stage nature of the automatic drain process employed by the automatic drain device allows a precise and repeatable amount of water to be drained from the water sump despite variable conditions in the fuel water separator filter system. As described above, the design of the device produces a substantially constant mass flow rate of water out of the water sump, such that a high-pressure discharge of fluid is avoided and the mass flow rate is siphon-limited in both pressure side and suction side applications. This allows the amount of water removed from the water sump to be controlled by simply controlling the amount of time the automatic drain device is maintained in an open position. Additionally, the volume of the interior of the automatic drain device acts as an upper cap on the amount of water that may be drained from the water sump. The two-stage nature of the process allows flow either into or out of the interior of the automatic drain device. As a result, the maximum amount of water that may be removed from the water sump in a single operation is equivalent to the free volume of the interior of the automatic drain device because water does not flow out of the interior of the device until the flow of water into the device is stopped. These features independently allow the amount of water removed from the water sump to be precisely controlled, such that exactly the desired amount of the water is repeatedly removed from the water sump independent of the fuel load over the water contained in the water sump. In some embodiments, the volume of the interior of the automatic drain device, and thereby the volume of the drained water, may be about 30 ml.

Implementations described in this specification can be implemented in digital electronic circuitry, or in computer software, firmware, or hardware, including the structures disclosed in this specification and their structural equivalents, or in combinations of one or more of them. The implementations described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a controller or a data processing apparatus on data stored on one or more computer-readable storage devices or received from other sources. The term "data processing apparatus" or "controller" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The functional units described in this specification may be considered to be modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed:

1. An automatic drain device for use with a fuel water separator filter system, comprising:
   a housing, wherein the housing comprises:
      an upper housing comprising an inlet opening that allows fluid to flow into an interior portion of the automatic drain device;
      a lower housing comprising at least one vent, wherein the upper housing is attached directly to the lower housing; and
      an inner housing comprising a drain opening, the inner housing disposed between the upper housing and the lower housing,
      wherein the interior portion of the automatic drain device is formed between the upper housing and the inner housing;
   a water-in-fuel sensor;
   a double plunger solenoid comprising:
      an upper drain seal and a lower drain seal disposed on opposite axial ends of the double plunger solenoid, the double plunger solenoid being movable between a closed position in which the upper drain seal seals the inlet opening and the lower drain seal is positioned distal from the drain opening so to as allow fluid flow through the drain opening, and an open position in which the upper drain seal is located distal from the inlet opening to allow the fluid flow through the inlet opening, and the lower drain seal seals the drain opening; and
   a control unit configured to activate the double plunger solenoid in response to a signal from the water-in-fuel sensor,
   wherein the activation of the double plunger solenoid places the automatic drain device in a condition such that the fluid may flow into the automatic drain device.

2. The automatic drain device according to claim 1, wherein the upper housing further comprises an air vent configured to allow air to be communicated from the interior portion of the automatic drain device.

3. The automatic drain device according to claim 2, wherein the air vent is located on an extension of the upper housing, such that the air vent is located at a higher fluid level than the inlet opening when the automatic drain device is installed in the fuel water separator filter system.

4. The automatic drain device according to claim 1, further comprising a strainer engaged with the upper housing to prevent debris from entering the automatic drain device.

5. The automatic drain device according to claim 1, wherein an absorbent media is disposed in the lower housing.

6. The automatic drain device according to claim 1, wherein the inner housing is sealingly engaged with the upper housing.

7. The automatic drain device according to claim 1, wherein the upper housing is attached to the lower housing by threaded engagement.

8. The automatic drain device according to claim 1, wherein the upper housing further comprises an attachment mechanism configured to attach the automatic drain device to the fuel water separator filter system.

9. An automatic drain device for use with a fuel water separator filter system, comprising:
   a housing, wherein the housing comprises:

an upper housing comprising an inlet opening that allows fluid to flow into an interior portion of the automatic drain device;

a lower housing comprising at least one vent; and an inner housing comprising a drain opening, the inner housing disposed between the upper housing and the lower housing, wherein the interior portion of the automatic drain device is formed between the upper housing and the inner housing;

a water-in-fuel sensor;

a double plunger solenoid comprising:

an inlet opening seal and a drain opening seal disposed on opposite axial ends of the double plunger solenoid, the double plunger solenoid being movable between a closed position in which the inlet opening seal seals the inlet opening and the drain opening seal is positioned distal from the drain opening so as to allow fluid flow through the drain opening, and an open position in which the inlet opening seal is located distal from the inlet opening to allow the fluid flow through the inlet opening, and the drain opening seal seals the drain opening; and a control unit configured to activate the double plunger solenoid in response to a signal from the water-in-fuel sensor;

wherein the activation of the double plunger solenoid places the automatic drain device in a condition such that the fluid may flow into the automatic drain device, and wherein the double plunger solenoid is attached to the upper housing.

10. The automatic drain device according to claim 1, wherein the control unit is attached to or located in the upper housing.

11. The automatic drain device according to claim 1, further comprising a biasing spring configured to maintain the double plunger solenoid in the closed position that prevents the fluid flow into the automatic drain device when the double plunger solenoid is not activated.

12. The automatic drain device according to claim 1, further comprising:

an upper solenoid extension; and an air vent seal disposed on the upper solenoid extension, wherein the upper solenoid extension comprises an air flow passage, and the air vent seal is configured to prevent air flow out of an air vent of the housing when the double plunger solenoid is not activated.

13. A fuel water separator filter system, comprising:

a fuel water separator filter element;

a filter housing including a water sump; and an automatic drain device comprising:

a housing, wherein the housing comprises:

an upper housing comprising an inlet opening that allows fluid to flow into an interior portion of the automatic drain device;

a lower housing comprising at least one vent, wherein the upper housing is attached directly to the lower housing; and an inner housing comprising a drain opening, the inner housing disposed between the upper housing and the lower housing, wherein the interior portion of the automatic drain device is formed between the upper housing and the inner housing;

a water-in-fuel sensor;

a double plunger solenoid comprising:

an upper drain seal and a lower drain seal disposed on opposite axial ends of the double plunger solenoid, the double plunger solenoid being movable between a closed position in which the upper drain seal seals the inlet opening and the lower drain seal is positioned distal from the drain opening so as to allow fluid flow through the drain opening, and an open position in which the upper drain seal is located distal from the inlet opening to allow the fluid flow through the inlet opening, and the lower drain seal seals the drain opening; and a control unit configured to activate the double plunger solenoid in response to a signal from the water-in-fuel sensor, wherein the activation of the double plunger solenoid places the automatic drain device in a condition such that the fluid may flow from the water sump into the automatic drain device.

* * * * *